(12) United States Patent
Lee et al.

(10) Patent No.: US 10,423,312 B2
(45) Date of Patent: Sep. 24, 2019

(54) METHOD OF STYLING CONTENT AND TOUCH SCREEN DEVICE FOR STYLING CONTENT

(71) Applicant: Samsung Electronics Co., Ltd., Suwon-si, Gyeonggi-do (KR)

(72) Inventors: Dong-chang Lee, Suwon-si (KR); Dong-hyuk Lee, Seoul (KR); Won-hee Lee, Suwon-si (KR); Jae-kyung Kwak, Ansan-si (KR); Sang-ho Kim, Hwaseong-si (KR); Jae-woong Lee, Suwon-si (KR); Ho-young Jung, Hwaseong-si (KR); Seong-taek Hwang, Pyeongtaek-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1020 days.

(21) Appl. No.: 14/853,127

(22) Filed: Sep. 14, 2015

(65) Prior Publication Data

US 2016/0085422 A1    Mar. 24, 2016

(30) Foreign Application Priority Data

Sep. 18, 2014  (KR) .................... 10-2014-0124632

(51) Int. Cl.
| | | |
|---|---|---|
| *G06F 3/0484* | (2013.01) | |
| *G06F 3/0482* | (2013.01) | |
| *G06F 3/0488* | (2013.01) | |
| *G06T 11/60* | (2006.01) | |
| *G06F 17/24* | (2006.01) | |
| *G06K 9/00* | (2006.01) | |

(52) U.S. Cl.
CPC ........ *G06F 3/04845* (2013.01); *G06F 3/0482* (2013.01); *G06F 3/04883* (2013.01); *G06F 17/242* (2013.01); *G06T 11/60* (2013.01); *G06K 9/00402* (2013.01)

(58) Field of Classification Search
CPC .............. G06F 3/04883; G06F 17/242; G06F 3/03545; G06F 3/04845; G06F 3/0484; G06K 9/00402; G06K 9/00449; G06K 9/222; G06T 11/60
See application file for complete search history.

(56) References Cited

U.S. PATENT DOCUMENTS

| | | | |
|---|---|---|---|
| 7,259,752 B1 * | 8/2007 | Simmons ............ | G06F 3/04817 345/173 |
| 7,659,890 B2 | 2/2010 | Simmons | |
| 8,643,605 B2 | 2/2014 | Yu et al. | |
| 2006/0233441 A1 * | 10/2006 | Clary .................. | G06F 3/03545 382/187 |
| 2014/0157119 A1 | 6/2014 | Lim | |

(Continued)

FOREIGN PATENT DOCUMENTS

KR    10-2009-0102886 A    10/2009

*Primary Examiner* — Nicholas Ulrich
(74) *Attorney, Agent, or Firm* — Jefferson IP Law, LLP

(57) ABSTRACT

A method of styling content on a touch screen device is provided. The method includes receiving a user's input with respect to an attribute item of a stroke-based object, receiving a user's touch input with respect to a region indicating the stroke-based object on a touch screen, and changing an attribute value of the stroke-based object based on the attribute item of the stroke-based object and the received user's touch input.

24 Claims, 27 Drawing Sheets

(56) References Cited

U.S. PATENT DOCUMENTS

| | | |
|---|---|---|
| 2014/0189593 A1 | 7/2014 | Kurita et al. |
| 2014/0191983 A1 | 7/2014 | Choi et al. |
| 2014/0245137 A1 | 8/2014 | Kim et al. |
| 2015/0146986 A1* | 5/2015 | Sugiura .............. G06K 9/00402 382/189 |
| 2016/0048318 A1* | 2/2016 | Markiewicz ........ G06F 3/04883 345/173 |
| 2016/0147436 A1* | 5/2016 | Tsutsui ............... G06K 9/00416 715/268 |

* cited by examiner

FIG. 6A
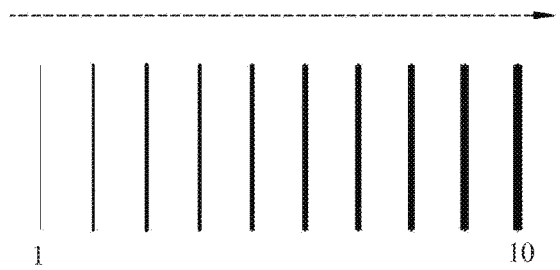
FIG. 6B
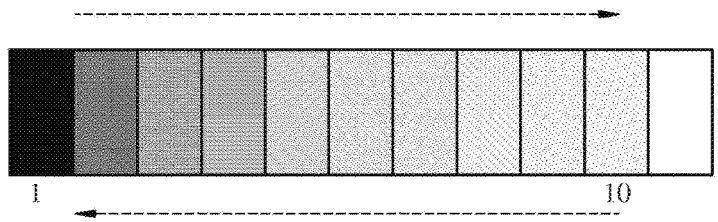
FIG. 6C
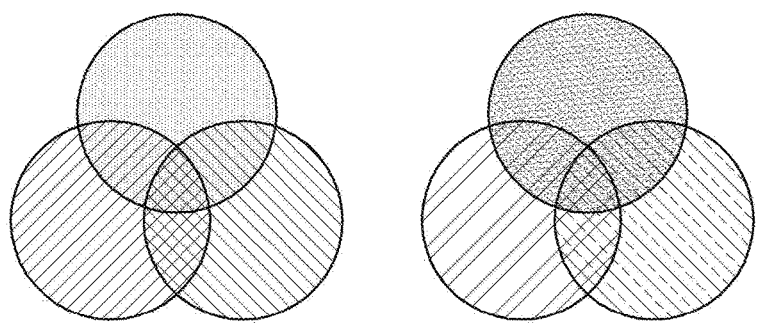
FIG. 6D (a)

1. $\int u\,dv = uv - \int v\,du$

2. $\int u^n\,du = \dfrac{u^{n+1}}{n+1} + C,\ n \neq -1$

3. $\int \dfrac{du}{u} = \ln|u| + C$

FIG. 20B

1. $\int u\,dv = uv - \int v\,du$

2. $\int u^n\,du = \dfrac{u^{n+1}}{n+1} + C,\ n \neq -1$

3. $\int \dfrac{du}{u} = \ln|u| + C$

FIG. 20C

1. $\int u\,dv = uv - \int v\,du$

2. $\int u^n\,du = \dfrac{u^{n+1}}{n+1} + C,\ n \neq -1$

3. $\int \dfrac{du}{u} = \ln|u| + C$

2425

2435

FIG. 25A $$3 \int \frac{du}{u} = \ln|u| + C$$

／2510

FIG. 25B $$3 \int \frac{du}{u} = \ln|u| + C$$

／2520

FIG. 25C $$3 \int \frac{du}{u} = \ln|u| + C$$

FIG. 26A $$2 \int u^n du = \frac{u^{n+1}}{n+1} + C, \, n \neq -1$$

2610 — $3 \int \frac{du}{u} = \ln|u| + C$ $$4 \int e^u du = e^u + C$$

FIG. 26B $$2 \int u^n du = \frac{u^{n+1}}{n+1} + C, \, n \neq -1$$

$3 \int \frac{du}{u} = \ln|u| + C$ — 2620

$$4 \int e^u du = e^u + C$$

FIG. 26C $$2 \int u^n du = \frac{u^{n+1}}{n+1} + C, \, n \neq -1$$

2630 — $3 \int \frac{du}{u} = \ln|u| + C$ $$4 \int e^u du = e^u + C$$

FIG. 26D $$2 \int u^n du = \frac{u^{n+1}}{n+1} + C, \, n \neq -1$$

$3 \int \frac{du}{u} \;=\; \ln|u| \;+\; C$ — 2640

$$4 \int e^u du = e^u + C$$

FIG. 28A

2810 — $3 \int \frac{du}{u} = \ln|u| + C$ $4 \int e^u du = e^u + C$ $5. a^u du = \frac{a^u}{\ln a} + C$ 2820 — $6. \int \sin u \ du = -\cos u + C$

FIG. 28B $\int \sin u \, du = -\cos u + C$ — 2830

| FORM 1 |
| FORM 2 |
| FORM 3 |

2831  2832  2833

METHOD OF STYLING CONTENT AND TOUCH SCREEN DEVICE FOR STYLING CONTENT

CROSS-REFERENCE TO RELATED APPLICATION(S)

This application claims the benefit under 35 U.S.C. § 119(a) of a Korean patent application filed on Sep. 18, 2014 in the Korean Intellectual Property Office and assigned Serial number 10-2014-0124632, the entire disclosure of which is hereby incorporated by reference.

TECHNICAL FIELD

The present disclosure relates to methods of styling content and touch screen devices for styling content.

BACKGROUND

An input method of a device has evolved from a method of using a key pad to a touch screen method of receiving a touch input of a user via a touch recognition device included in a screen of the device.

Devices using touch screen methods are widely used for various portable terminals, such as portable phones including smartphones, Moving Picture Experts Group phase 1 or phase 2 (MPEG-1 or MPEG-2) audio layer 3 (MP3) players, personal digital assistants (PDAs), portable multimedia players (PMPs), play station portables (PSPs), portable game devices, or digital media broadcasting (DMB) receivers, various monitors of devices such as navigation devices, industrial terminals, laptop computers, financial automatic machines, game devices, and input devices of various electronic devices such as home electronic appliances, for example, refrigerators, microwave ovens, or washing machines.

In addition, along with the development of digital content, attempts to develop virtual reality using digital devices have been undertaken in various fields. Furthermore, along with the development of touch input methods, a user may perform various touch operations such as a touch, a drag, a flick, a swipe, or pinching on a device. As various touch operations with respect to the device have been enabled, a user's sense of reality has increased with respect to an event that occurs in response to an operation input in the device. Accordingly, a virtual reality program using a touch screen type device has been attempted in various fields.

Recently, as a touch screen device such as a tablet personal computer (PC) has been used as text books for students, there is a need for a technology of displaying and editing teaching plans or various contents on the touch screen device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of styling content on a touch screen device and an apparatus for styling content displayed on a touch screen device.

In accordance with an aspect of the present disclosure, a method of styling content on a touch screen device is provided. The method includes receiving a user's input with respect to an attribute item of a stroke-based object, receiving a user's touch input with respect to a region indicating the stroke-based object on a touch screen, and changing an attribute value of the stroke-based object based on the attribute item of the stroke-based object and the received user's touch input.

In accordance with another aspect of the present disclosure, a touch screen device for styling content is provided. The touch screen device includes an input unit configured to receive a user's input with respect to an attribute item of a stroke-based object and receive a user's touch input with respect to a region indicating the stroke-based object on a touch screen, a control unit configured to change an attribute value of the stroke-based object based on the attribute item of the stroke-based object and the received user's touch input, and a display unit configured to display the stroke-based object having the changed attribute value on the touch screen.

In accordance with another aspect of the present disclosure, a non-transitory computer-readable storage medium is provided. The non-transitory computer-readable storage medium stores instructions that, when executed, cause at least one processor to perform a method including receiving a user's input with respect to an attribute item of a stroke-based object, receiving a user's touch input with respect to a region indicating the stroke-based object on a touch screen, and changing an attribute value of the stroke-based object based on the attribute item of the stroke-based object and the received user's touch input.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6A, 6B, 6C, and 6D are diagrams of an attribute in an object according to an embodiment of the present disclosure;

FIGS. 19A, 19B, 20A, 20B, and 20C are diagrams of objects before and after styling content according to an embodiment of the present disclosure;

FIGS. 22, 23, 24A, 24B, 24C, 24D, 25A, 25B, 25C, 25D, 26A, 26B, 26C, and 26D are diagrams of predetermined objects before and after styling the predetermined objects according to an embodiment of the present disclosure;

FIGS. 27A, 27B, 27C, 28A, 28B, and 28C are diagrams for describing a method of styling content according to an embodiment of the present disclosure.

Throughout the drawings, it should be noted that like reference numbers are used to depict the same or similar elements, features, and structures.

DETAILED DESCRIPTION

Figure 1:
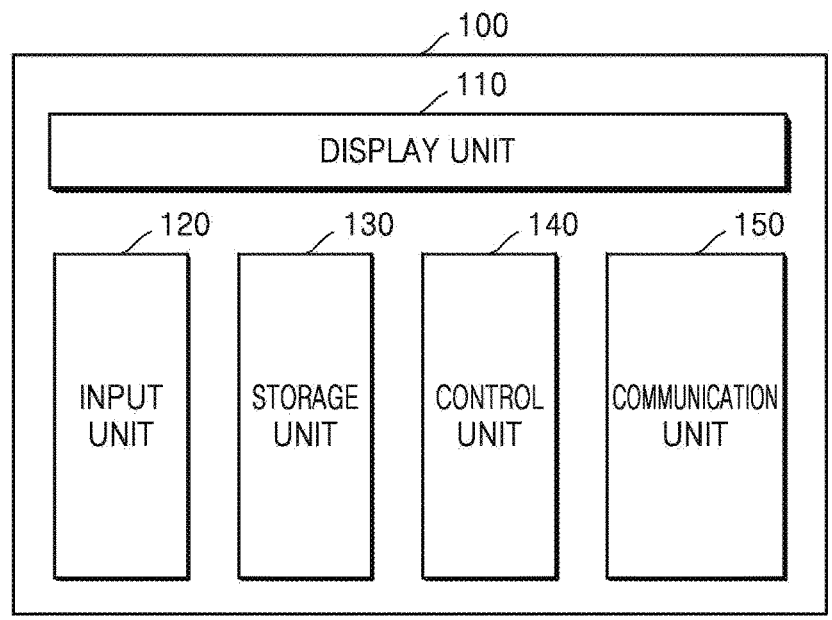
FIG. 1 is a block diagram of a touch screen device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Reference will now be made in detail to various embodiments, examples of which are illustrated in the accompanying drawings, wherein like reference numerals refer to like elements throughout, and the sizes or thicknesses of elements are exaggerated for clarity.

Throughout the specification, the term "touch input" means a gesture or the like that is performed by a user on a touch screen so as to control a device. In addition, as used herein, the term "touch input" may include a touch (for example, floating or hovering) performed in the state of not touching a touch screen and being spaced a predetermined distance or more apart from the touch screen.

For example, as used herein, examples of the touch input include a drag, a flick, a tap, a double tap, and a swipe.

The term "drag" means an operation in which a user touches a screen with a finger or a stylus and maintains the touch while moving the finger or the stylus to another position on the screen.

The term "tap" means an operation in which a user touches a screen with a finger or a stylus (for example, an electronic pen) immediately removes the finger or the stylus from the screen.

The term "double-tap" means an operation in which a user briefly successively touches a screen twice with a finger or a stylus.

The term "flick" means an operation in which a user performs a drag with a finger or a stylus at a critical speed or more. Generally, drag and flick may be distinguished from each other based on whether a moving speed of a finger or a stylus is a critical speed or more, but in the specification, it is considered that "flick" is included in "drag."

The term "swipe" (or swype) means an operation in which a user touches a predetermined region on a screen with a finger or a stylus and horizontally or vertically moves the finger or the stylus a predetermined distance on the screen. A movement in a diagonal direction may not be recognized as a swipe event. In the specification, it is considered that "swipe" is included in "drag."

Also, the term "touch & hold" means an operation in which a user touches a screen with a finger or a stylus and holds a touch input for a critical time or more. That is, a time difference between a touch-in time and a touch-out time is equal to greater than the critical time. The touch & hold may be combined with a long touch. A feedback signal may be visually or acoustically provided to a user when the touch input is maintained for the critical time or more so as to allow the user to recognize whether the touch input is a tap or a touch & hold.

The term "drag & drop" means an operation in which a user selects identification information of an application by grabbing it by using a finger or a stylus, drags the identification information to a predetermined position, and drops the identification information at the predetermined position by releasing the screen touch.

The term "pinch to zoom" means an operation in which a user gradually increases or decreases a distance between two or more fingers or touch tools. When the distance between the fingers is increased, the pinch to zoom may be used as an input for magnifying an image on a touch screen, and when the distance between the fingers is decreased, the pinch to zoom may be used as an input for reducing an image.

Throughout the specification, the term "motion input" means a motion performed by a user with respect to a device so as to control the device. For example, the motion input may include an input in which the user rotates, tilts, and vertically and horizontally moves the device. The device may sense a motion input preset by the user using an acceleration sensor, a slant sensor, a gyro sensor, a 3-axis magnetic sensor, or the like.

Throughout the specification, the term "bending input" means an input in which a user bends all or some regions of an electronic device so as to control the electronic device when the device a flexible display device. According to various embodiments of the present disclosure, the device may sense a bending position (coordinate value), a bending direction, a bending angle, a bending speed, a bending number, a bending operation occurrence time, or a bending operation holding time by using a bending sensor.

Throughout the specification, the term "key input" means an input for controlling the device by using a physical key adhering to the device.

Throughout the specification, the term "multiple-input" means a motion in which at least two inputs are combined. For example, the device may receive a user's touch input and motion input and may receive the user's touch input and voice input. In addition, the device may receive the user's touch input and eyeball input. The eyeball input means an input in which the user adjusts an eye-blink, a gaze position, a moving speed of an eyeball, or the like.

According to some embodiments, the device may include a communication unit that receives an application executing command from external devices (not illustrated) interworking with the device.

Examples of the external devices (not illustrated) may include mobile phones, smartphones, notebook computers, tablet personal computers (PCs), electronic book (E-book) readers, digital broadcasting terminals, personal digital assistants (PDAs), portable multimedia players (PMPs), navigation devices, or a Moving Picture Experts Group phase 1 or phase 2 (MPEG-1 or MPEG-2) audio layer 3 (MP3) but are not limited thereto.

For example, the user may request execution of an application installed on the device through the mobile phone, the smartphone, the notebook computer, the tablet PC, or the navigation interworking with the device. The external devices may transmit the application executing command to the device by using a local area network (for example, Bluetooth (BT), near field communication (NFC), or wi-fi direct (WFD)).

According to an embodiment of the present disclosure, the device may execute the application in response to the user's input. The user's input may be an input for requesting the execution of the application. In addition, the device may receive the application executing command from the external devices (not illustrated) interworking with the device and may execute the application of the device.

FIGS. 1 through 30B, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element FIG. 1 is a block diagram of a touch screen device according to an embodiment of the present disclosure.

Referring to FIG. 1, a touch screen device 100 is illustrated, where the touch screen device 100 may include a display unit 110, an input unit 120, a storage unit 130, a control unit 140, and a communication unit 150.

The display unit 110 may display an image of a program executed in the touch screen device 100. The display unit 110 may include an image panel such as a liquid crystal panel or an organic light-emitting panel and may display a graphic of a user interface displaying a function setting, a software application, or content (hereinafter, referred to as an operation menu) such as a music, an image, or a video.

The input unit 120 may receive a user's operation with respect to the touch screen device 100, such as the user's touch input, button input, or pen input. The touch input may be input on a touch screen that is the display unit 110.

The storage unit 130 may convert signals input from the outside into data types to store the converted signals. The storage unit 130 may cumulatively store the user's input information received to the touch screen device 100 and may perform a cancellation and a withdrawal with respect to an attribute value before and after styling the content. The storage unit 130 may store data transmitted from external devices or a server through the other communication unit 150.

The control unit 140 may select a predetermined object through the user's input with respect to a received stroke-based object. An attribute value of the object may be changed based on a styling input with respect to the selected predetermined object. Hereinafter, detail descriptions will be provided with reference to the accompanying drawings.

The communication unit 150 may receive an application executing command from external devices interworking with the touch screen device 100. Examples of the external devices may include mobile phones, smartphones, notebook computers, tablet PCs, E-book readers, digital broadcasting terminals, PDAs, PMPs, navigation devices, or an MP3 but are not limited thereto. For example, the user may request execution of an application installed on the touch screen device 100 through the mobile phones, the smartphones, the notebook computers, the tablet PCs, or the navigation devices interworking with the touch screen device 100. The external devices may transmit the application executing command to the touch screen device 100 by using a local area network (for example, BT, NFC, or WFD).

Figure 2:
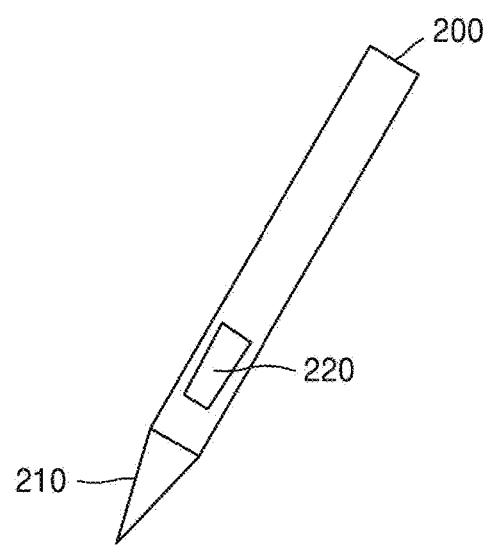
FIG. 2 is a view of an operation device performing an input with respect to a touch screen device according to an embodiment of the present disclosure.

FIG. 2 is a view of an operation device performing an input with respect to a touch screen device according to an embodiment of the present disclosure.

Referring to FIG. 2, a touch screen device 100, as illustrated in FIG. 1, may receive a user's input through a touch input using a body such as the user's finger and may receive the user's input using an operation device 200 such as a stylus pen.

In the case of a pen input using the stylus pen, the operation device 200 may include a touch unit 210 that senses an electromagnetic signal transmitted from the touch screen device 100 and an auxiliary button 220 that implements various operations using a pen.

When the input unit 120 of the touch screen device 100 senses a touch of the operation device 200, the input unit 120 may determine a touch position of the operation device 200. The touch position may be determined as the user's position. The input unit 120 of the touch screen device 100 may sense an approach of the operation device 200. In the touch screen device 100 provided with a capacitive sensor, a variation in capacitance may be sensed under a surface of the touch screen. The touch screen device 100 may be provided with a magnetic field sensor or an electromagnetic induction sensor to sense a touch or an approach of the operation device 200 when a variation in magnetic field is generated in an electromagnetic space and may determine an input position of the operation device 200.

The input unit 120 of the touch screen device 100 may sense a touch pressure (pen pressure) at the touch position of the operation device 200. The operation device 200 may be an electromagnetic resonance (EMR) type stylus pen. Since the stylus pen is provided with a resonance circuit, when the touch pressure of the operation device 200 increases with respect to the touch screen, the resonance circuit in the stylus pen operates in response to the electromagnetic signal transmitted from the touch screen device 100, so that the touch screen device 100 may detect more resonance values to calculate the detected resonance values into the touch pressure. A variable capacitor, a variable coil, or a variable resistor may be added to the resonance circuit in the stylus pen to obtain various the resonance values. Therefore, the touch screen device 100 may sense and distinguish various pen pressures of the operation device 200.

The control unit 140 of the touch screen device 100 may determine the user's control command based on a received input of the operation device 200. The control unit 140 may search for a control command corresponding to the input of the operation device 200, which is received in interaction database (DB) information stored in the storage unit 130 and may control the touch screen device 100.

Hereinafter, the user's input with respect to the touch screen device 100 according to an embodiment will be described based on the premise of the pen input. Various methods of styling the content may be described with the touch input even by using the body such as the user's finger, but in the embodiment, since content styling is about the touch screen device 100 as teaching materials for education, an experiential user interaction may be provided through a pen input that is a tool for education. The disclosure set forth herein is not limited to an operation by the pen input, and it should be noted that the operation is possible by the user's touch input described above.

Figure 3:
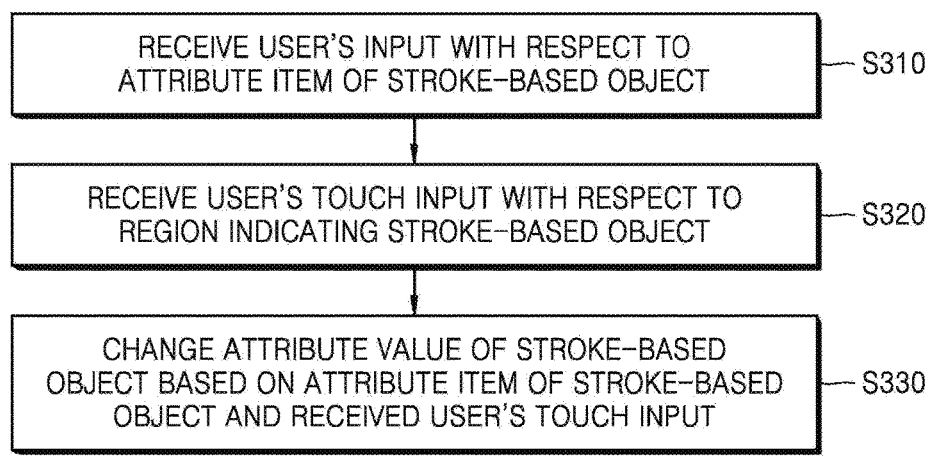
FIG. 3 is a flowchart of a method of styling content according to an embodiment of the present disclosure.

FIG. 3 is a flowchart of a method of styling content according to an embodiment of the present disclosure.

Referring to FIG. 3, a flowchart is illustrated, such that in operation S310, the touch screen device 100, as illustrated in FIG. 1, may receive a user's input with respect to an attribute item of a stroke-based object.

In the embodiment, the term "stroke-based object" means an object consisting of one stroke on a touch screen and may also be widely construed as meaning an object consisting of a combination of a plurality of strokes. Therefore, the stroke-based object may be one line, one character, one sentence, or one graph. The meaning of the stroke will be described in detail with reference to FIG. 4.

The term "object" means all or some regions of the content displayed on the touch screen. One image displayed on the touch screen may be one object, and text information including one sentence or a plurality of sentences may be one object.

The term "attribute of an object" means information for displaying the object on the touch screen, such as a size, a color, or a type of a content object.

In operation S320, the touch screen device 100 may receive the user's touch input with respect to a region indicating the object. The touch screen device 100 may determine an object selected from the user. The touch screen device 100 may determine whether the user's touch input styles a predetermined object of objects displayed on the touch screen from an interaction database pre-stored in a storage unit 130.

In operation S330, the touch screen device 100 may change an attribute value of the object based on the attribute item of the object and the received user's touch input. The touch screen device 100 may change the attribute value of the object to style the size, the color, or the type of the object with respect to the object selected by the user's touch input.

Figure 4:
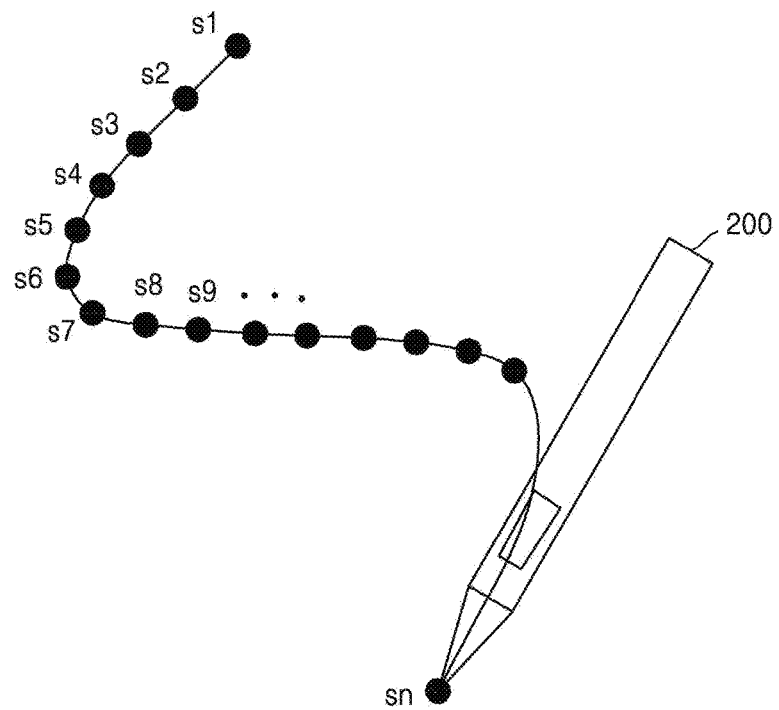
FIG. 4 is a diagram for describing a stroke-based input according to an embodiment of the present disclosure.

FIG. 4 is a diagram for describing a stroke-based input according to an embodiment of the present disclosure.

Referring to FIG. 4, the input unit 120, as illustrated in FIG. 1, of the touch screen device 100, as illustrated in FIG. 1, may be an operation device 200 for receiving various types of user's inputs. The input unit 120 may receive various types of inputs such as a general touch input performed by touching a predetermined region on the touch screen for a short time, a double click input performed by clicking the predetermined region twice, and a long press input performed by touching the predetermined region for a predetermined time or more.

The input unit 120 may receive a line-shaped input from the user. The input unit 120 may receive a vertical and horizontal input on the touch screen or may receive a free curve-shaped input.

As illustrated in FIG. 4, the input unit 120 may receive a line-shaped input from the user and may determine coordinates of each of dots forming a line. The input unit 120 may receive a free curve consisting of n dots from s1 to sn (where n is a natural number) from the user to determine the coordinates of each of the dots according to the user's input locus. The coordinates may be correlated with each other to form one stroke. The control unit 140, as illustrated in FIG. 1, of the touch screen device 100 may determine a locus as one stroke information to generate an object. At this time, the locus is a locus from dot coordinates s1 on which a touch of a pen is started on the touch screen to dot coordinates sn on which the touch of the pen is ended on the touch screen.

The storage unit 130, as illustrated in FIG. 1, of the touch screen device 100 may store the user's stroke input as the one stroke information in which a plurality of dot coordinates are correlated with each other and may separately store coordinate information of each of point coordinates s1 to sn at the same time. The separate storing of the coordinate information is because the coordinate information is used later in the case that needs to separate the object generated by the one stroke into two or more pieces of stroke information.

A variety of information may be included in the attribute of the stroke-based object. The user's input with respect to the touch screen may be classified into a thick type or a thin type according to a pen pressure of the user's input or a selected thickness. Therefore, the attribute of the stroke-based object may include information on the thickness.

Color information may be included in the attribute of the stroke-based object. In order to determine a color displayed on the touch screen, the color information acquired by combining various colors may be included in the attribute of the stroke-based object.

An input type may be included in the attribute of the stroke-based object. The operation device 200 operated on the touch screen may be one type, but the control unit 140 of the touch screen device 100 may allow various input types such as a brush type and a pen type to be implemented on the touch screen. Various input types may be provided to the user, thereby expressing a realistic content object.

The attribute of the stroke-based object may be stored in a table type in the database of the storage unit 130. For example, the attribute of the stroke-based object may be stored as shown in Table 1 below.

TABLE 1

|  | Time | Thickness | Color | Type |
|---|---|---|---|---|
| Object 1 | 2014.07.16 18:26:03 | 5 | Blue | Pen |
|  | 2014.07.16 18:29:27 | 4 | Red | Brush |

As shown in Table 1, the storage unit 130 may match the attribute value of each of the objects with an input time to store the attribute value, and when the attribute value is changed, the storage unit 130 may cumulatively store the attribute value before and after the change. Therefore, even after the attribute value is changed, the changed attribute value may be restored to the previous attribute value.

As described above, coordinates constituting the stroke information may be stored in a table type in the database. For example, the coordinates may be stored as shown in Table 2 below.

TABLE 2

|  | Time | Thickness | Color | Type |
|---|---|---|---|---|
| s1 Coordinates | 2014.07.16 18:26:03 | 5 | Blue | Pen |
| (s1x, s1y) | 2014.07.16 18:29:27 | 4 | Red | Brush |
| s2 Coordinates | 2014.07.16 18:26:04 | 5 | Blue | Pen |
| (s2x, s2y) | 2014.07.16 18:29:28 | 4 | Red | Brush |
| s3 Coordinates | 2014.07.16 18:26:05 | 5 | Blue | Pen |
| (s3x, s3y) | 2014.07.16 18:29:29 | 4 | Red | Brush |
| s4 Coordinates | 2014.07.16 18:26:06 | 5 | Blue | Pen |
| (s4x, s4y) | 2014.07.16 18:29:30 | 4 | Red | Brush |
| s5 Coordinates | 2014.07.16 18:26:07 | 5 | Blue | Pen |
| (s5x, s5y) | 2014.07.16 18:29:31 | 4 | Red | Brush |
| sn Coordinates | 2014.07.16 18:26:10 | 5 | Blue | Pen |
| (snx, sny) | 2014.07.16 18:29:34 | 4 | Red | Brush |

As shown in Table 2, in the case that a point coordinate database is separately stored, when the object is classified into two or more objects, for example, point coordinates s1 to s3 are displayed with a red color, and coordinates s4 to sn are displayed with a blue color, the attribute of the object may be partially changed.

Figure 5:
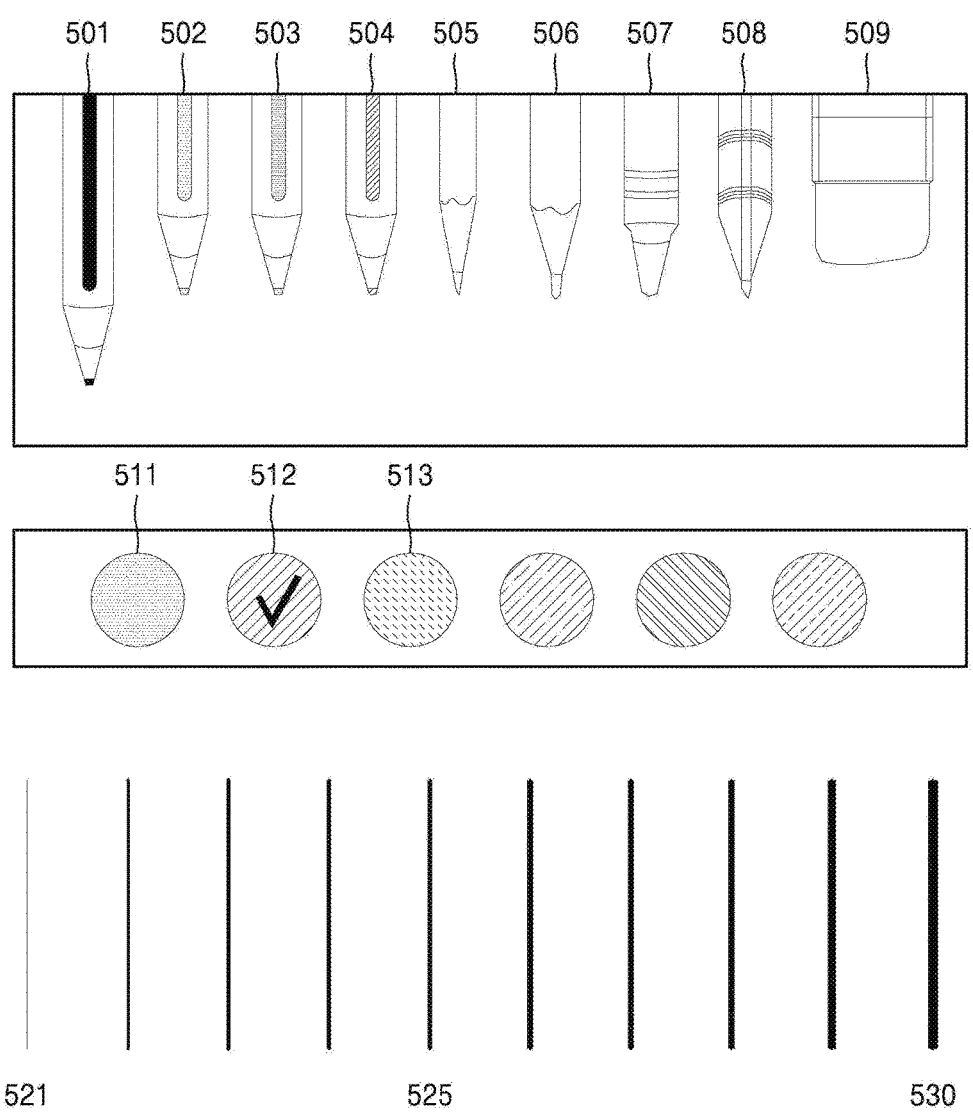
FIG. 5 is a diagram for describing an attribute item of an object displayed on a touch screen device according to an embodiment of the present disclosure.

FIG. 5 is a diagram for describing an attribute item of an object that is displayed on a touch screen device according to an embodiment of the present disclosure.

Referring to FIG. 5, when a user performs an input with respect to desired styling so as to style an object displayed on a touch screen, a touch screen device 100 may determine the attribute item of the object based on the user's input.

As illustrated in FIG. 5, items representing various types of stylings may be displayed on the touch screen. Referring to FIG. 5, items such as a black color pencil 501, a red color pencil 502, a blue color pencil 503, and a different color pencil 504 are illustrated and may be displayed to the user so as to select an input type and a color at the same time. Otherwise, a thin pencil 505 and a thick pencil 506 may be displayed to the user so as to select a thickness, and different types of pencils 507 and 508 may be displayed to be selected. An editing tool such as an eraser 509 may be displayed which erases a whole or a portion of the object.

The touch screen device 100 may display various colors 511, 512 and 513 in a type such as a palette on the touch screen such that the user easily selects a color. In addition, the touch screen device 100 may display lines 521, 525, and 530 with various thicknesses on the touch screen to allow the user to personally select a desired thickness.

FIGS. 6A to 6D are diagrams of an attribute in an object according to an embodiment of the present disclosure.

Referring to FIGS. 6A to 6D, the touch screen device 100, as illustrated in FIG. 1, which receives an input with respect to a change in attribute of the object from a user, may increase or decrease an attribute value in a predetermined unit as a method of changing the attribute of the object.

As illustrated in FIG. 6A, when it is desired to change an attribute of an object, that is, a line thickness, it is assumed that the thinnest attribute value is 1 and the thickest attribute value is 10, the attribute value may be changed by about +1/−1 or by a multiple value of about +1/−1.

As illustrated in FIG. 6B, a shade of the object may be changed, and it is assumed that the darkest value is 1 and the brightest value is 10, the attribute value may be changed by about +1/−1 or by a multiple value of about +1/−1.

As illustrated in FIG. 6C, three primary colors may be mixed to allow the user to select a desired color. The attribute value may be differently defined according to a mixture ratio of each color. Each color may be expressed in one intrinsic value by using a combination of the attribute values, such as a red-green-blue (RGB), a hue-saturation-brightness (HSB), and a cyan-magenta-yellow-black (CMYK), and the each color may be changed into a different color by changing a ratio of the combination.

As illustrated in FIG. 6D, various effects with respect to objects (e.g., objects 3, 4, 5 and 6) may be stored as the attribute value. In the case of writing-recognized objects, the presence or absence of an underline may be defined as one attribute value, and different attribute values may be defined according to a shape of the underline. In addition, an outer frame line with respect to a predetermined object may be expressed in a box, and the box may be defined as one attribute value. Different attribute values may be defined according to a shape of the box. In addition, the presence or absence of a slant effect with respect to the object may be defined as one attribute value, and different attribute values may be defined according to a degree of a slant. The presence or absence of a bold face, which emphasizes an object displayed on the touch screen with a bold face, may be an attribute value of the object.

In the embodiment, only attributes of the object, such as the aforementioned color, shade, chroma, and a thickness are not limited to the attribute of the object, and it should be noted that various stylings with respect to the object may be stored as the attribute value.

Figure 7:
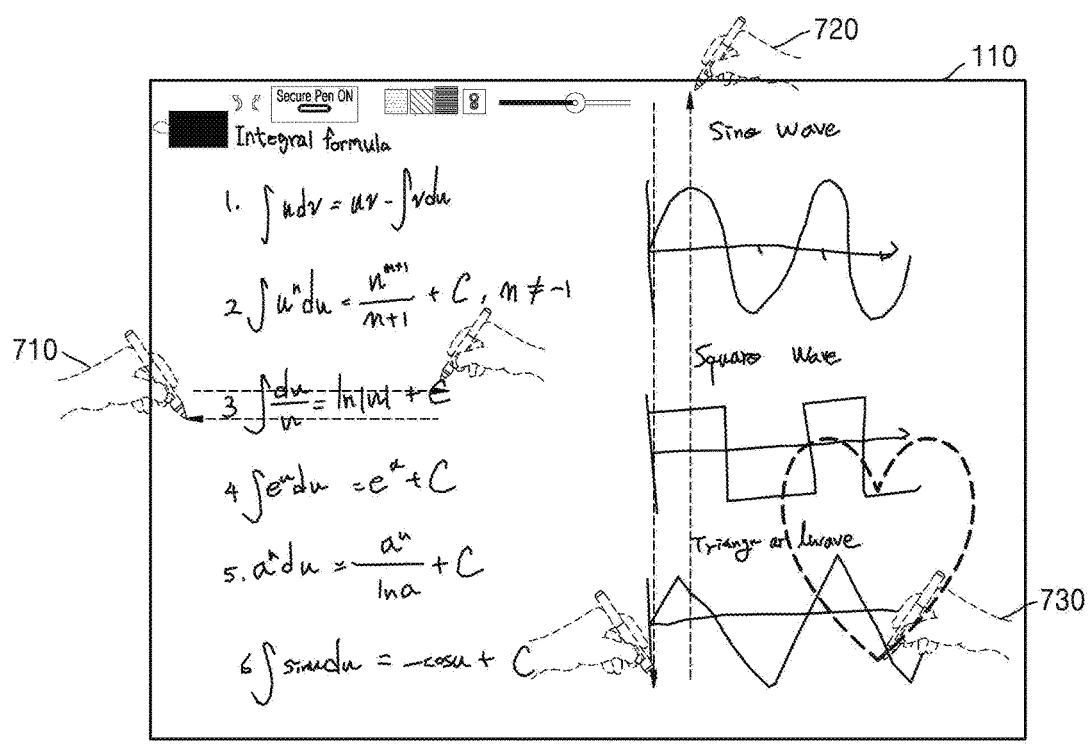
FIG. 7 is a diagram for describing a user's touch input according to an embodiment of the present disclosure.

FIG. 7 is a diagram for describing a user's touch input according to an embodiment of the present disclosure.

Referring to FIG. 7, a display unit 110 is illustrated, such that when the user selects desired styling, the touch screen device 100, as illustrated in FIG. 1, stores an attribute value of an object (e.g., any of objects 1, 2, 3, 4, 5 and 6) corresponding to the styling and waits to change an attribute value of which object, that is, waits to receive the user's touch input with respect to a styling region.

The user may perform various types of inputs on a touch screen, but in the embodiment, a description will be focused on the selection of a region indicating an object whose attribute value is changed through a drag (or swipe) input.

The input unit 120, as illustrated in FIG. 1, of the touch screen device 100 may receive a horizontal drag input 710 related to a leftward-and-rightward movement on the touch screen, a vertical drag input 720 related to an upward-and-downward movement, and an irregular free curve drag input 730.

At this time, the term "horizontal drag" may not necessarily mean only a linear drag input parallel to a horizontal axis of the touch screen device 100 but may be widely construed as meaning leftward and rightward drag inputs within a predetermined error range, and the term "vertical drag" may be widely construed as meaning an upward-and-downward drag input within the same error range as the horizontal drag.

According to an embodiment, when the user's drag input is performed on the touch screen from a left to a right (hereinafter, abbreviated to a "rightward drag input"), the touch screen device 100 may receive the user's drag input as an input for increasing an attribute value with respect to an object region performed the drag input.

On the contrary, when the user's drag input is performed on the touch screen from a right to a left (hereinafter, abbreviated to a "leftward drag input"), the touch screen device 100 may receive the user's drag input as an input for decreasing an attribute value with respect to an object region performed the drag input.

For example, a stroke-based mathematical formula may be displayed as an object on the touch screen by the user's pen input. At this time, when the touch screen device 100 receives, from the user, an input for selecting an attribute item of the mathematical formula object that is to become thicker and receives the rightward drag input with respect to a region displaying the mathematical formula object (assuming that 1 is the thinnest thickness, and 10 is the thickest thickness), the touch screen device 100 may increase by about +1 a thickness attribute value of the mathematical formula object disposed in a region through which the rightward drag input passes on the touch screen or may increase the thickness attribute value to a thickness value designated by the user. At this time, when the leftward drag input is again received from the user with respect to the mathematical formula object whose thickness value is changed, the thickness attribute value of the mathematical formula object may be decreased by about −1, or the thickness attribute value may be decreased to a thickness value before the change.

In the case that an attribute value of an object is located at a boundary value, when an attribute change value deviating from the boundary value is input, the attribute value of the object may not be changed. For example, in the case that it is impossible to display the object at a thicker thickness (for example, thickness attribute value 1), when a thickness decreasing command is received from the user, the attribute value may not be changed but may be maintained to an initial thickness.

In another example, when thickness attribute value 10 is the thickest attribute value, the thickness attribute value of the object displayed on the touch screen is 8, and a command is input from the user, the touch screen device 100 may increase a thickness to the maximum thickness 10+ or may display the message "not performing the command" on the touch screen to guide the user to perform a different input. At this time, the input command is a command allowing the thickness attribute value to be increased by about +3.

According to an embodiment of the present disclosure, when the user's drag input is performed on the touch screen downward (hereinafter, abbreviated to a "downward drag input") or upward (hereinafter, abbreviated to an "upward drag input"), the touch screen device 100 may determine the user's drag input as an input for selecting an object of a pre-set region. A process of selecting an object through the downward drag input will be described in detail below.

According to an embodiment of the present disclosure, the touch screen device 100 may determine the user's free curve drag input on the touch screen as an input for selecting an object of a region defined by a free curve.

For example, when a closed curve input such as a box input or a circular input is received from the user with respect to a predetermined region on the touch screen, the touch screen device 100 may determine the closed curve input as an input for selecting an object disposed inside of a closed curve. On the contrary, the touch screen device 100 may determine the closed curve input as an input for selecting an object disposed outside of the closed curve, and it is obvious that the inside or the outside may be changed by the user's setting. In addition, an object across the closed curve may also be selected according to a setting. When an object displayed on the touch screen is large in size, or the closed curve input by the user is difficult with respect to the object, the object may also be selected through an input passing through some regions of the object. When an object selection input is set to pass through the some regions of the object, the object selection input may be set to necessarily pass through a central portion of the object or pass through two or more points and may be distinguished from an erroneous input by the user.

The user's free curve drag may not necessarily be the closed curve. It is accurate to determine an object selected at the time when the user's input is the closed curve input, but forcing the user to perform the closed curve input may obstruct an intuitive and easy drag input. Therefore, when it is determined that the user's free curve drag input is the closed curve input within a predetermined error range, an object may be determined in the same manner as the receiving of the closed curve input. For example, a heart-shaped free curve drag input is received from the user, but a cross point of the drag may not exist. In this case, it is possible to determine an object selected by connecting two points nearest to each other on the free curve to generate one closed curve region.

Hereinafter, a process of selecting an object to be styled will be described in detail.

Figure 8A:
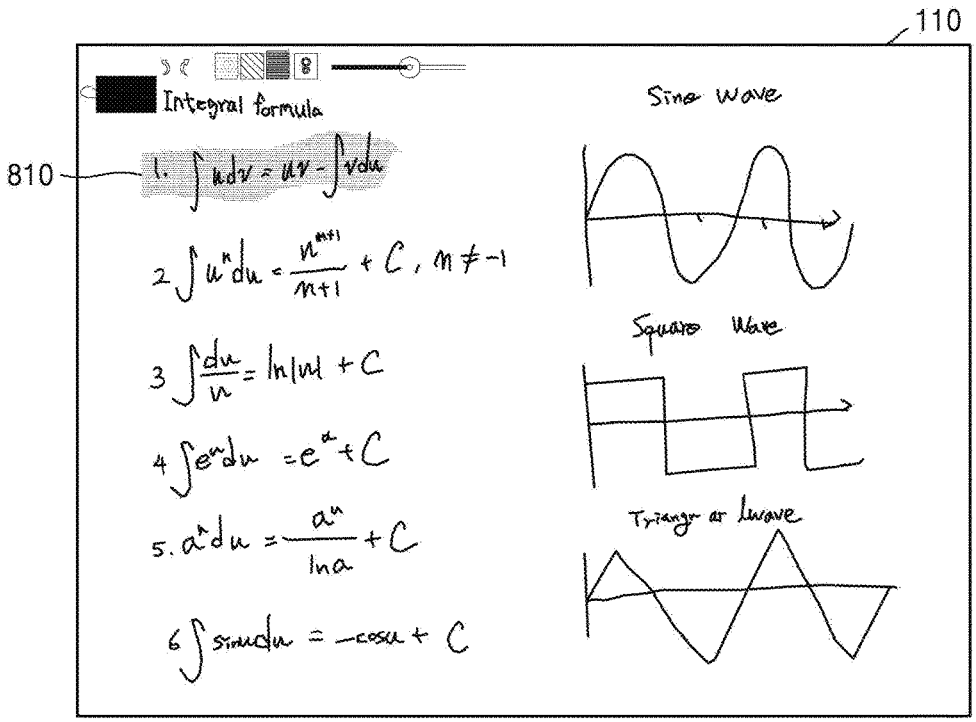
FIGS. 8A and 8B are diagrams of objects before and after styling content according to an embodiment of the present disclosure.
Figure 8B:
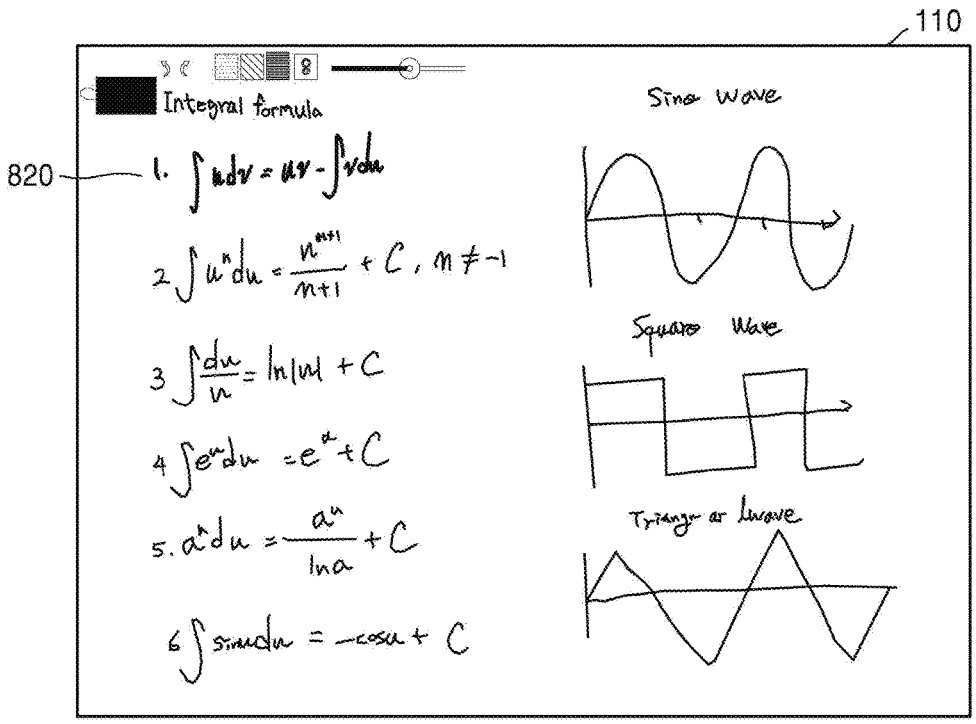

FIGS. 8A and 8B are diagrams of objects before and after styling content according to an embodiment of the present disclosure.

Referring to FIGS. 8A and 8B, a display unit 110 is illustrated, in which stroke-based objects may be displayed on a touch screen by information input from a user or received from the outside. Mathematical formulas (e.g., any of objects 1, 2, 3, 4, 5 and 6) are illustrated in FIGS. 8A and 8B, and the input unit 120, as illustrated in FIG. 1, of the touch screen device 100, as illustrated in FIG. 1, may receive an input styling a specific mathematical formula from a user.

The user may determine an attribute item to be styled. The user may select a specific attribute item of various attributes such as a color and a thickness and may select an object whose attribute value is to be changed into the selected attribute value. Integral formula objects 1 to 6, and sine wave, square wave, and triangular wave graphs are displayed in FIGS. 8A and 8B, each of the integral formulas of the graphs may be represented as one object.

Specifically, as illustrated in FIG. 8A, when the attribute item value selected by the user is for styling of changing the attribute of integral formula object 1 810 into a red color, and a red highlighter-typed rightward drag input is received from the user with respect to integral formula object 1 810, as illustrated in FIG. 8B, the control unit 140, as illustrated in FIG. 1, of the touch screen device 100 may display integral formula object 1 820 with a red color.

Since the objects are the stoke-based objects, although the user's fluorescent color input is not an input covering the whole of integral formula object 1 810, it may be determined that an object is selected which is substantially the same as a region input by a highlighter. Therefore, in FIG. 8A, although some regions of the integral formula object 1 810 are excluded from the highlighter input, it may be determined that the whole of the integral formula object 1 801 is selected as one object.

Although the stroke-based objects, the stroke-based objects may be stored in a database for coordinate information constituting stroke information of the object. As described with reference to Table 2, when attribute values of coordinates constituting one stroke are separately stored, in FIG. 8A, some regions of integral formula object 1 810 excluded from the highlighter input may not be selected as an object to be styled.

Since such a setting may be changed according to the user's setting, when the stroke-based object is stored in the database as the stroke information and the coordinate information, it is possible to provide styling that is consistent with the user's intention more.

Figure 9:
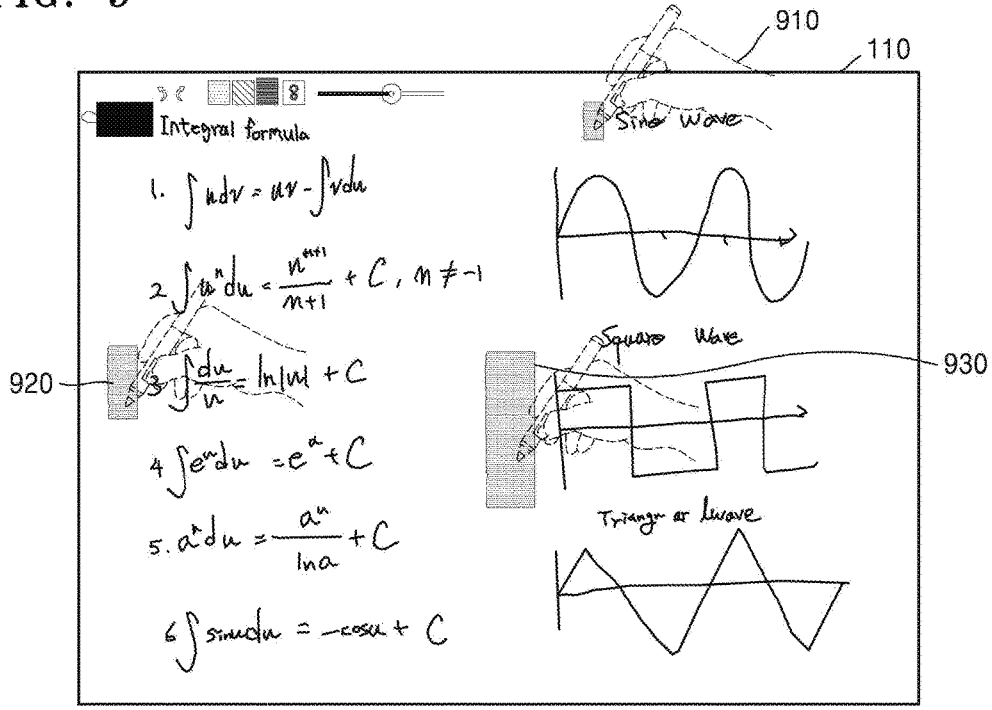
FIG. 9 is a diagram for describing a touch input according to an embodiment of the present disclosure.

FIG. 9 is a diagram for describing a touch input according to an embodiment of the present disclosure.

Referring to FIG. 9, a display unit 110 is illustrated, such that since a user's input may be inaccurate with respect to the object selection, the user's input for selecting the object may be set to predetermined sizes 910, 920 and 930.

For example, when an input for selecting a specific object (e.g., any of objects 1, 2, 3, 4, 5 and 6) displayed on a touch screen is received in a highlighter type, a range of selecting the object may vary according to a size of the displayed predetermined object. Therefore, setting information may be received from the user with respect to a thickness of the highlighter about the input for selecting the object. The thickness of the highlighter may be changed according to a pen pressure with respect to operation device 200, as illustrated in FIG. 2, of the user. When a pen pressure of a drag input is high, a touch screen device 100 may determine a thick highlighter, and when the pen pressure of the drag input is low, the touch screen device 100 determine a thin highlighter. When a large sized graph or image is selected, it may be advantageous to select the object in the manner as described above. However, when the drag input is received by thickening the highlighter, there is a limit that an unnecessary object may be selected at the same time.

FIGS. 10 to 17B are diagrams for describing a process of selecting a predetermined object according to an embodiment of the present disclosure.

As described with reference to FIG. 9, a process of selecting a stroke-based object may be described more variously as a process of selecting an object to be styled.

Figure 10:
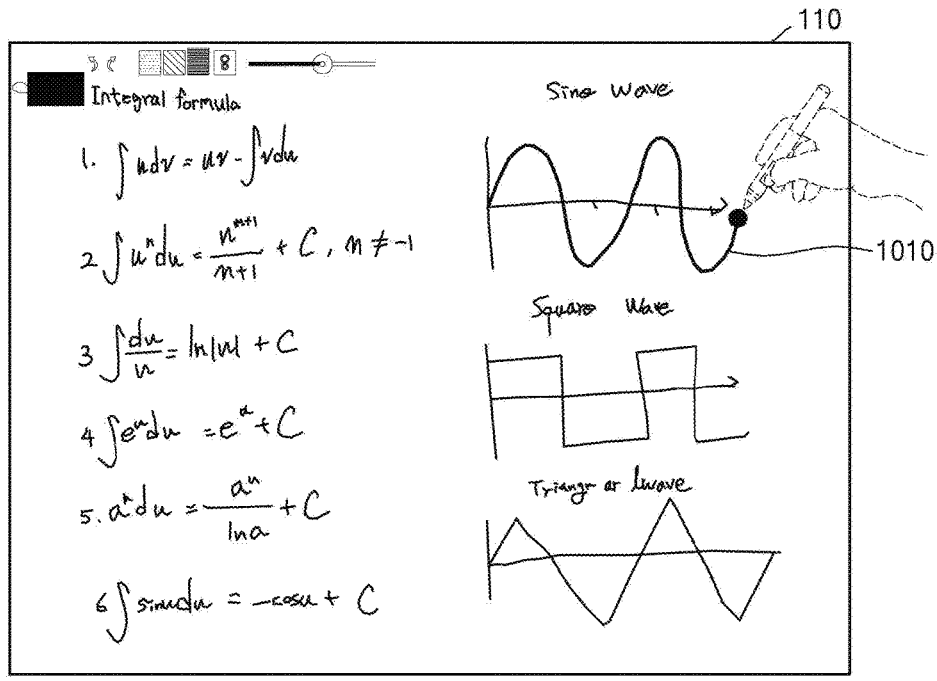
FIGS. 10, 11, 12A, 12B, 13, 14, 15, 16A, 16B, 17A, and 17B are diagrams for describing a process of selecting a predetermined object according to an embodiment of the present disclosure.

Referring to FIG. 10, a display unit 110 is illustrated, such that when a size of an object displayed on a touch screen is as large as a size of a graph, and it is intended to select not all but only some regions of the graph, it may be difficult to select the object in the manner described above. For example, when the whole of the graph is selected with a thick highlighter, an unnecessary object such as an X-axis or a Y-axis may also be selected considering the user's intention.

Therefore, a drag input along a locus of a desired object on the screen may be performed to select only a specific object desired by the user. The touch screen device 100, as illustrated in FIG. 1, may determine the object selected based on the drag input along the input locus. For example, when the input unit 120, as illustrated in FIG. 1, of the touch screen device 100 receives the drag input along a graph region on a sine wave graph, the touch screen device 100 may determine the drag input as an input for selecting the sine wave graph.

In a different manner described above, an object may be selected through an input for selecting a pre-set region of the desired object. Since the sine wave graph is a stroke-based object consisting of one stoke, when an input for selecting an end 1010 of the sine wave graph is received, it is possible to determine the input as an input for selecting a whole of the sine wave graph.

Hereinafter, a process of selecting an object through a vertical drag will be described in detail with reference to FIGS. 11 to 15.

Referring to FIGS. 11 to 15, a display unit 110 is illustrated, such that a user of the touch screen device 100, as illustrated in FIG. 1, may select the object through a vertical drag input. Generally, since an object displayed on a touch screen is downward read, a downward drag input may be an intuitive object selecting input to the user.

After the touch screen device 100 receives a change value with respect to a styling attribute from the user, the touch screen device 100 may receive an input with respect to an object of a region, to which the change value is applied. When a plurality of objects are selected and styled among objects displayed on the touch screen, it is inconvenient and non-intuitive to receive a selection input with respect to each of the objects from the user. Therefore, when the downward drag input is received to select the plurality of objects through one single input, all of objects in regions may be selected through which the downward drag input passes.

Figure 11:
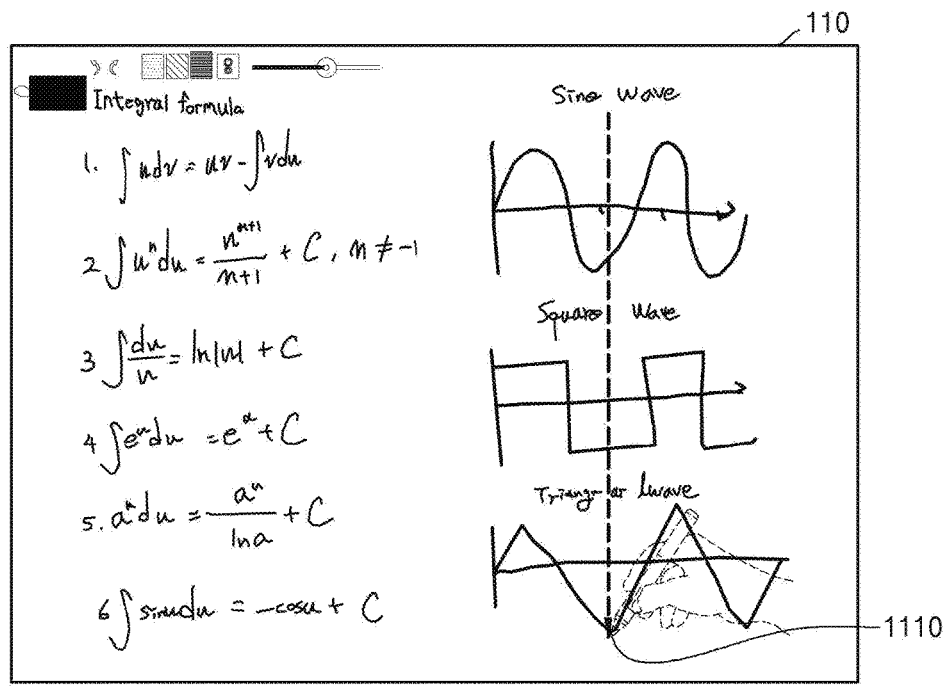

Referring to FIG. 11, each of integral formula objects 1 to 6 is one object, and each of a sine wave graph, a square wave graph, and a triangular wave graph also is one object. At this time, when the downward drag input is received with respect to all of graph regions 1110, the control unit 140, as illustrated in FIG. 1, of the touch screen device 100 may determine the downward drag input as an input for selecting objects such as the sine wave graph, the square wave graph, and the triangular wave graph.

The downward drag input may be used as an input for selecting all objects displayed on a touch screen. When the downward drag input is received on the touch screen, it may be difficult to distinguish whether the downward drag input is an input for selecting only objects through which the downward drag input passes or is an input for selecting all objects displayed on the touch screen.

The display unit 110, as illustrated in FIG. 1, of the touch screen device 100 may display a selected object unlike before selecting the object and may display to the user that the object is selected. According to the user's drag input, what object is selected may allow the user to cancel an erroneous input and may allow an object consistent with the user's intention to be accurately selected.

There may exist various methods of displaying that the object is selected. All coordinates of the selected object may be shifted by a specific value to display that the object is selected, and in this case, an effect may be obtained which is substantially the same as displaying a stereoscopic image. In addition, colors of selected objects may be changed to differ from colors before selecting the objects. The colors of the selected objects are changed to be unified into a specific color, thereby intuitionally displaying the selected objects.

A selected object region may also be differently displayed. A region surrounding a specific object may be displayed in a box shape to hatch the box region or differently shade the box region. A color or a thickness in the box region may be styled differently from a color or a thickness of other objects outside the relevant box region such that the selected specific object are distinguished from unselected other objects.

More specifically, when the user's selection input is currently continued on the touch screen, it is possible to differently display a portion of the box region surrounding the specific object in which the user's selection input is continued, or when the user's selection input is completed, it is possible to differently display the box region surrounding the selected specific object. As described above, the displaying of the selected region differently from the unselected region may be changed through various settings of the user.

Figure 12A:
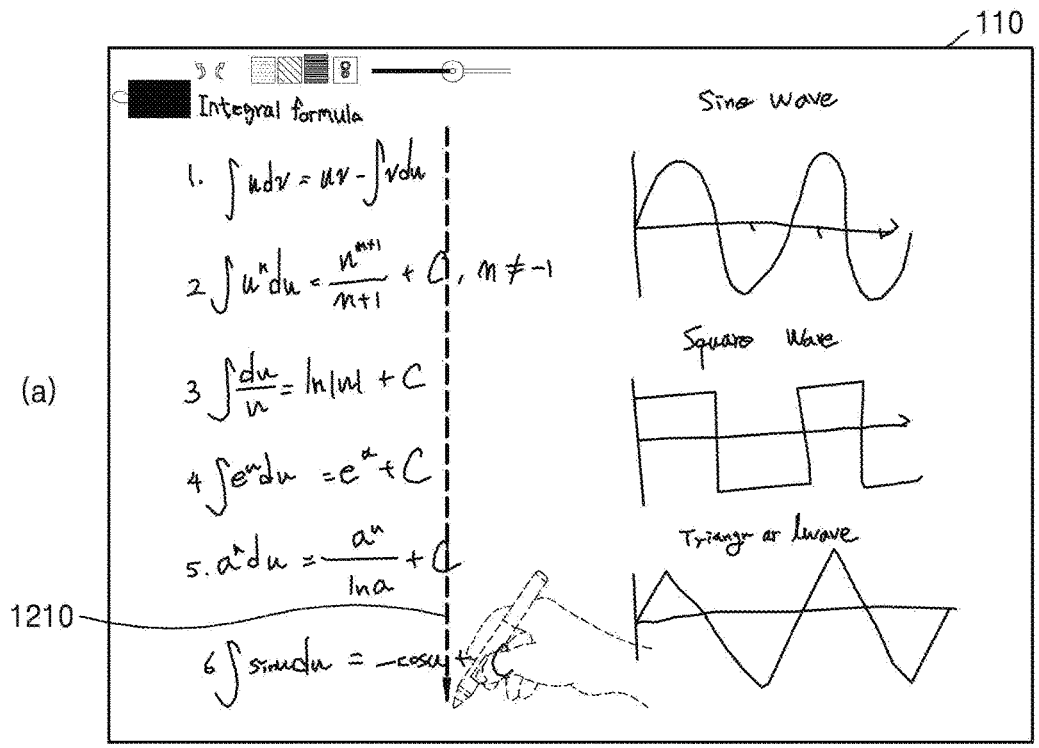

Referring to FIG. 12A, when a downward drag input 1210 is received on a touch screen, it may be difficult for a touch screen device 100 to distinguish whether the downward drag input 1210 is an input for selecting objects of integral formula objects 1 to 6 or is an input for selecting all objects displayed on the touch screen. In this case, in order for an accurate distinction, when the downward drag input is received in the state of pushing the auxiliary button 220, as illustrated in FIG. 2, of the operation device 200, as illustrated in FIG. 2, such as a stylus pen, a control unit 140 of the touch screen device 100 may determine the downward drag input as the input for selecting all objects displayed on the touch screen.

In a different manner, when a drag input passing through a specific region is received on the touch screen, the control unit 140 of the touch screen device 100 may determine the drag input as the input for selecting the displayed all objects. For example, when the downward drag input is received which passes through all of a central point region of an upper end and a central point region of a lower end in the touch screen, the control unit 140 may determine the downward drag input as the input for selecting the displayed all objects.

Figure 12B:
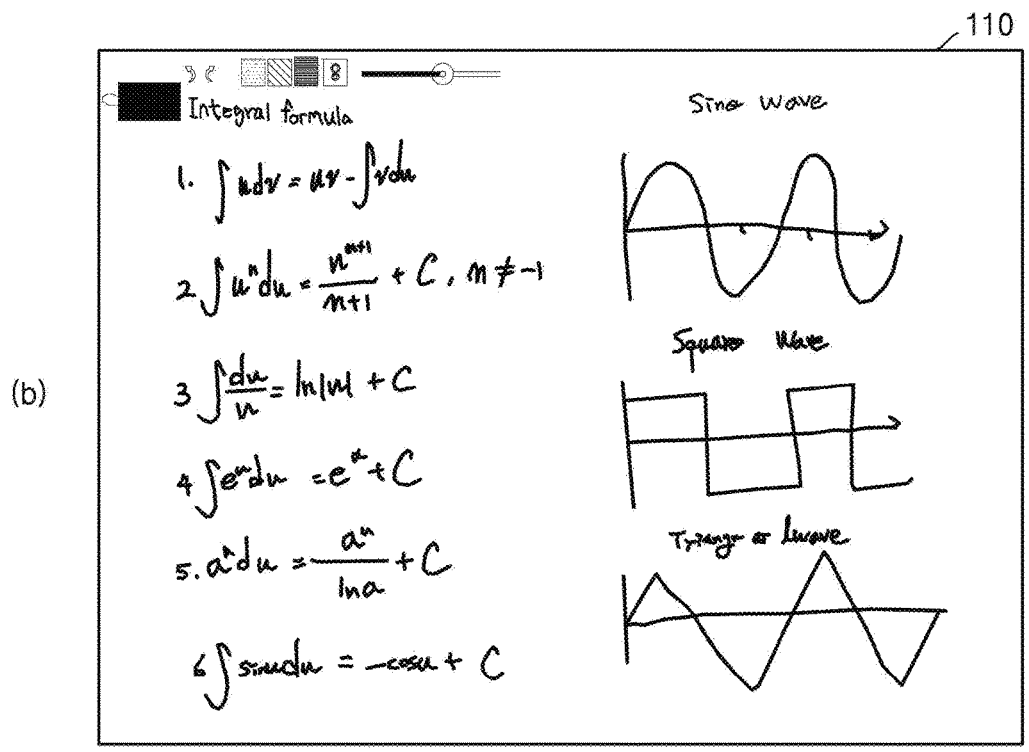

Referring to FIG. 12B, the display unit 110 of the touch screen device 100 may display a color or a thickness of a selected object differently from a color or a thickness of the object before selecting the object and may display to the user that the object is selected.

Hereinafter, assuming that a stroke-based object is writing-recognized, a process of selecting an object will be described with reference to FIGS. 13 to 15 such that the selected object is consistent with a user's intention.

The user's writing input on a touch screen may be stored in one text type through a writing recognition technology. Since the writing recognition technology is a technology generally used in an existing art that uses a stylus pen together with a tablet PC or the like, detailed descriptions thereof will be omitted.

Figure 13:
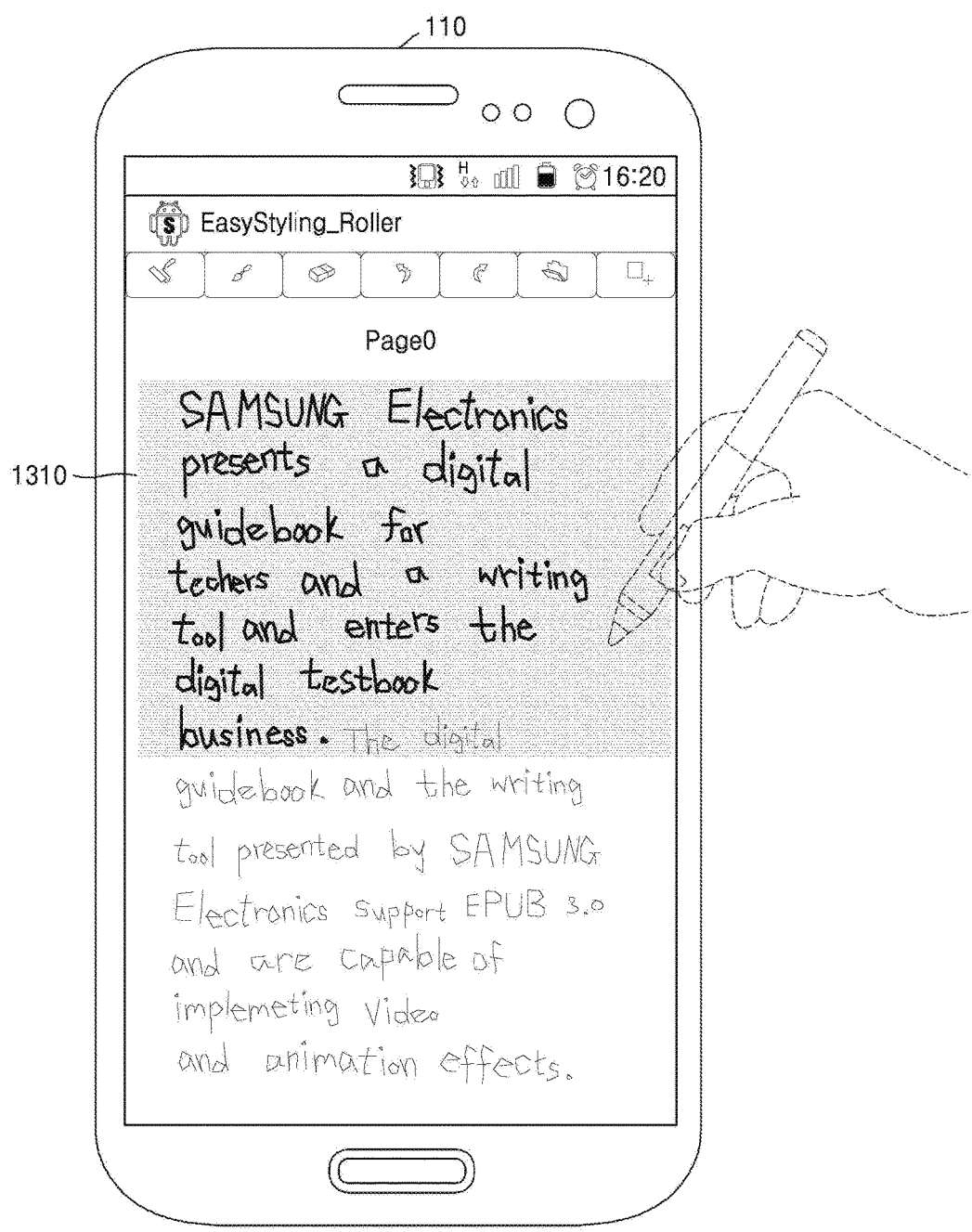

Referring to FIG. 13, the input unit 120, as illustrated in FIG. 1, of the touch screen device 100, as illustrated in FIG. 1, may receive a box-shaped input to select a written object from a user. For example, when a diagonal drag input is received in the state of pushing the auxiliary button 220, as illustrated in FIG. 2, of the operation device 200, as illustrated in FIG. 2, such as a stylus pen, the input unit 120 may receive the box-shaped input having a boundary defined by a start point and an end point of the diagonal drag input. In another example, the input unit 120 may receive a closed curve box-shaped input illustrated by the user.

The control unit 140, as illustrated in FIG. 1, of the touch screen device 100 may analyze writing information of the object based on the received box-shaped input. Writing may be text information and may consist of a plurality of sentences. A selected object may be determined by distinguishing sentences with respect to a punctuation mark such as a period indicating an end of a sentence, which is closest to a lower end of a selected box shape 1310.

As illustrated in FIG. 13, since a sentence is ended at the phrase "textbook business" that is closest to the lower end of the selected box shape, although the phrase "The digital" disposed behind the phrase "textbook business" is inside the selected box shape, the phrase "The digital" may be excluded from an object selection.

Figure 14:
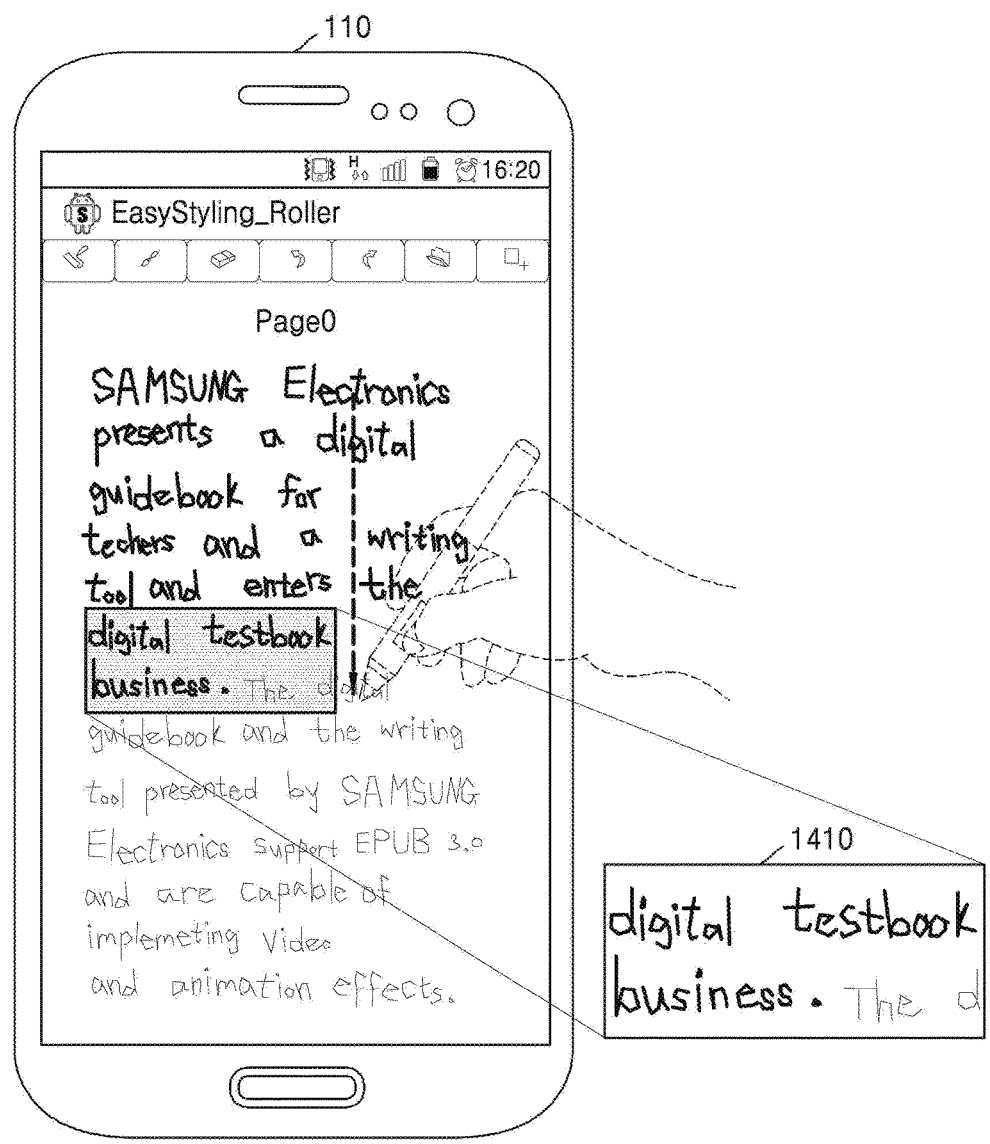

Referring to FIG. 14, a display unit 110 is illustrated, in which a writing object 1410 may be selected through a downward drag input. The control unit 140, as illustrated in FIG. 1, of the touch screen device 100, as illustrated in FIG. 1, may determine a selected object by distinguishing sentences with respect to a punctuation mark indicating an end of a sentence, which is closest to an end region of the downward drag input performed by a user. That is, when the downward drag input is an input with respect to the writing object 1410, the control unit 140 may determine the downward drag input as an input for selecting a sentence or a paragraph including the writing object 1410. The control unit 140 of the touch screen device 100 may determine that the downward drag input selects a paragraph corresponding to a touch input that is an important factor, with respect to a punctuation mark indicating an end of a sentence as well as a boundary of the paragraph when the paragraph is able to be distinguished.

Although the user's touch input is not an input with the writing object 1410, when the user's touch input is an input with respect to objects included in a predetermined layout, the control unit 140 of the touch screen device 100 may determine that the user's touch input selects all objects of the layout including the objects. For example, in the case that a plurality of writing objects and a plurality of figure objects are mixed into each other and are displayed on a touch screen, when a touch input is received, from the user, which is more important factor with respect to the figure objects, the control unit 140 of the touch screen device 100 may determine that the touch input selects the plurality of figure objects. In addition, the control unit 140 may determine that the touch input selects all of the plurality of figure objects and some writing objects through which the user's touch input passes. As described above, the selecting of the object may be variously modified according to the user's setting. Therefore, when determining that the touch input is a preset touch input with respect to an object, the control unit 140 of the touch screen device 100 may determine the touch input as a touch input for selecting the object.

The methods of FIGS. 13 and 14 are intuitive and easy as a process of selecting a writing object 1410, but it may be impossible to accurately determine the user's object selection intention. For example, as described with reference to FIG. 14, in the case of determining a period mark that is closest to the end region of the downward drag input, it may be impossible to accurately determine that the user wants to perform a selection up to any sentence. When the user performs an input for a selection only to a middle portion of a sentence, even an unnecessary portion may be selected.

Therefore, a method will be described which selects an object by receiving a drag input performed by combining a downward drag input and a rightward drag input of the user.

When writing is displayed across a plurality of rows on the touch screen, it is possible to determine an object selected by receiving the rightward drag input with respect to each row from the user. However, in this case, it may be inconvenient for the user to select the object several times. Therefore, all of rows are selected through the downward drag input, and then the rightward drag input is received, thereby it is possible to select objects up to a region in which the rightward drag input is ended.

Figure 15:
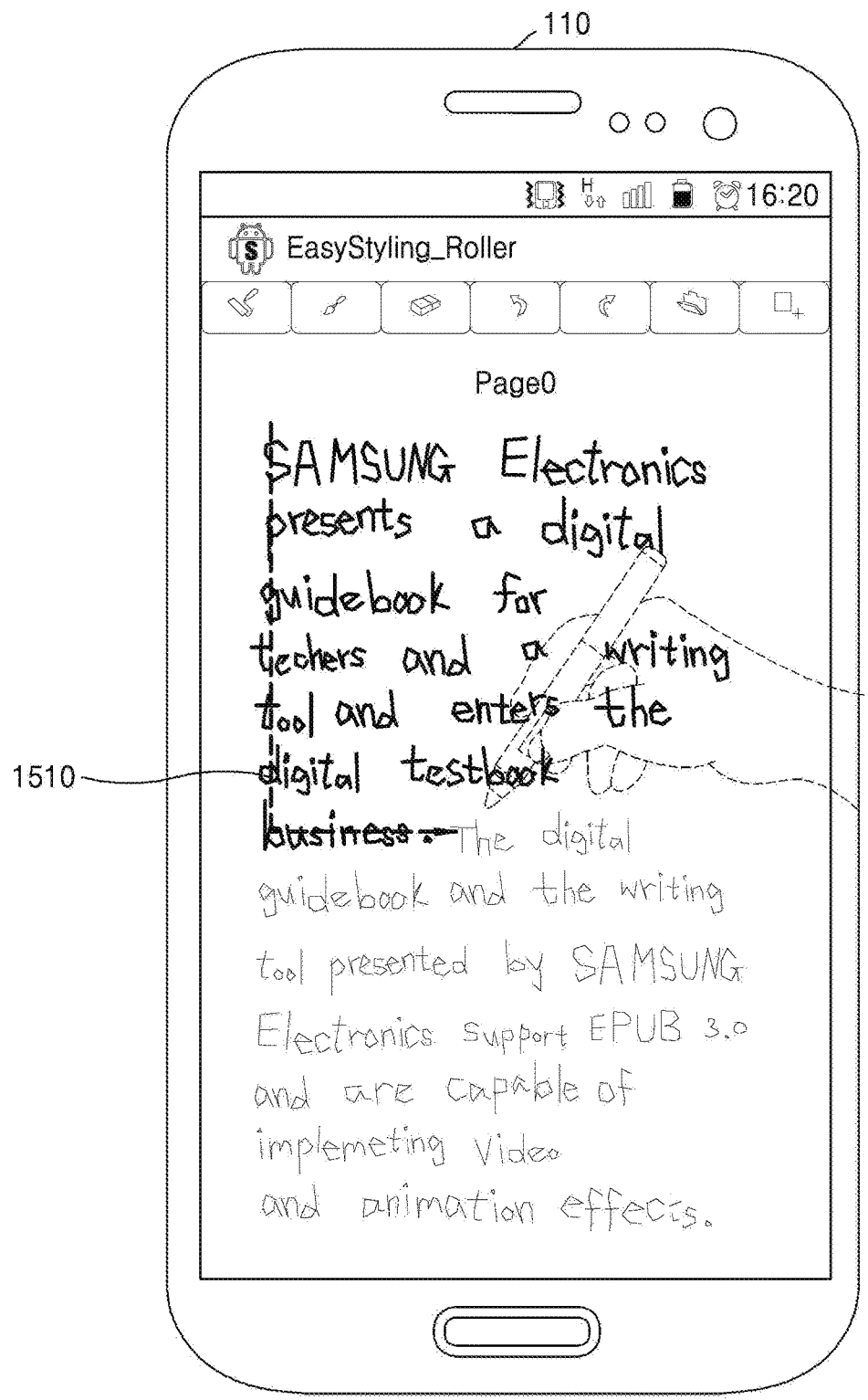

Referring to FIG. 15, when a downward drag input 1510 is received up to row 7, and a rightward drag input is received to the phrase "business" in row 7, it may be determined that a writing object is selected according to a region to the phrase "business" in row 7.

Hereinafter, a method of determining an object selected through a free curve drag input will be described with reference to FIGS. 16A to 17B.

A user may select a desired object on a touch screen through the free curve drag input, and the input unit 120, as illustrated in FIG. 1, of a touch screen device 100, as illustrated in FIG. 1, may determine an object selected among objects displayed on the touch screen based on the received free curve drag input.

Figure 16A:
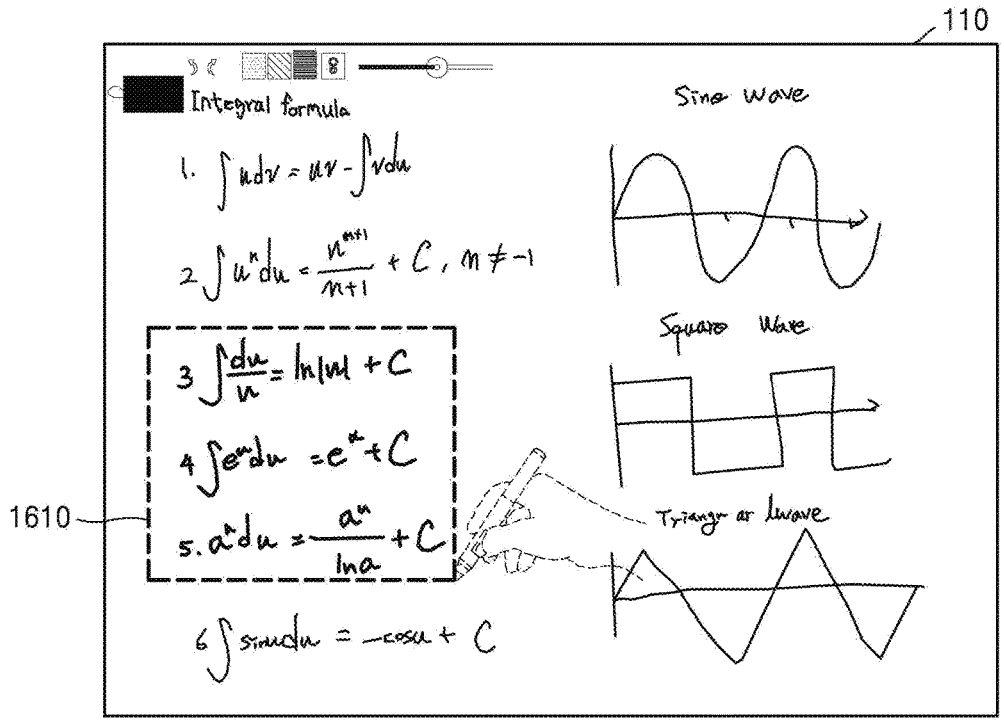
Figure 16B:
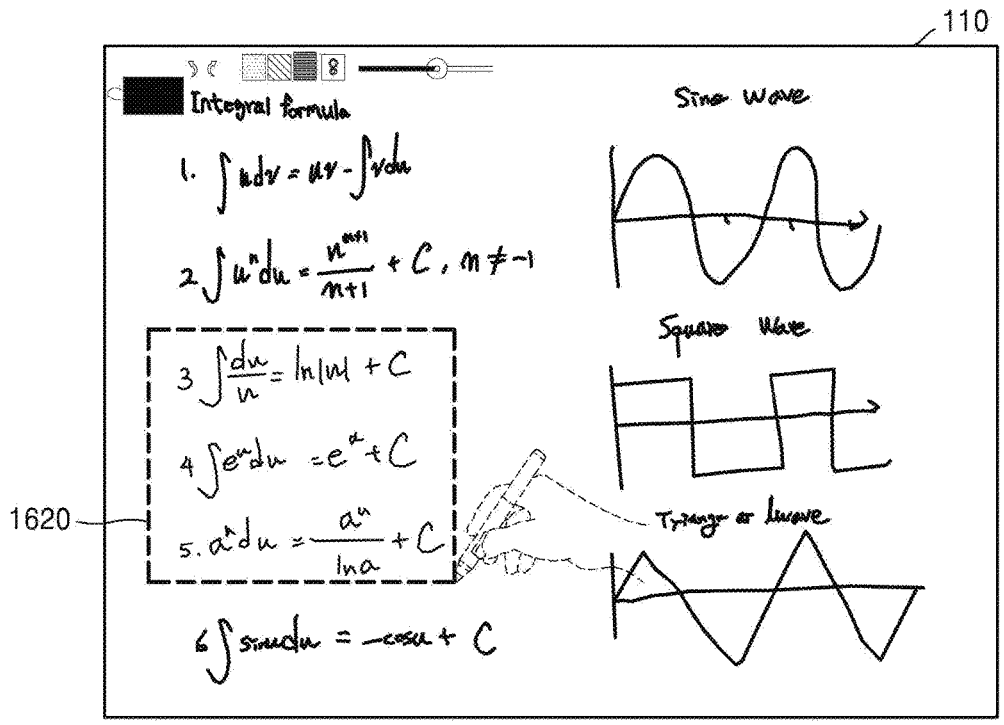

Referring to FIGS. 16A and 16B, it is possible to determine the object selected by receiving a box-shaped closed curve input. It is possible to determine only an object corresponding to a region inside a closed curve as the selected object and determine an object of a region excluding the region inside the closed curve as the selected object. In addition, it is also possible to select an object across the closed curve as the selected object.

Referring to FIG. 16A, a display unit 110 is illustrated, in which it is possible to determine only object corresponding to the region inside a closed curve 1610 as the selected object. A red color and a bold face are selected as an attribute item of an object to be styled by the user, and when the box-shaped closed curve input is received, the display unit 110 of the touch screen device 100, as illustrated in FIG. 1, may display objects of integral formula objects 3 to 5 corresponding to objects inside the closed curve 1610 with the red color and the bold face.

Referring to FIG. 16B, a display unit 110 is illustrated, in which only an object corresponding to a region outside a closed curve 1620 may be selected as the selected object. A red color and a bold face are selected an attribute item of an object to be styled by the user, and when the box-shaped closed curve input is received, the display unit 110 of the touch screen device 100, as illustrated in FIG. 1, may display, with the red color and the bold face, objects such as integral formula 1, integral formula 2, integral formula 6, sine wave graph, and a square wave graph corresponding to objects outside the closed curve 1620.

It is possible to determine an object selected through a free curve drag input having various shapes in addition to a box shape.

Figure 17A:
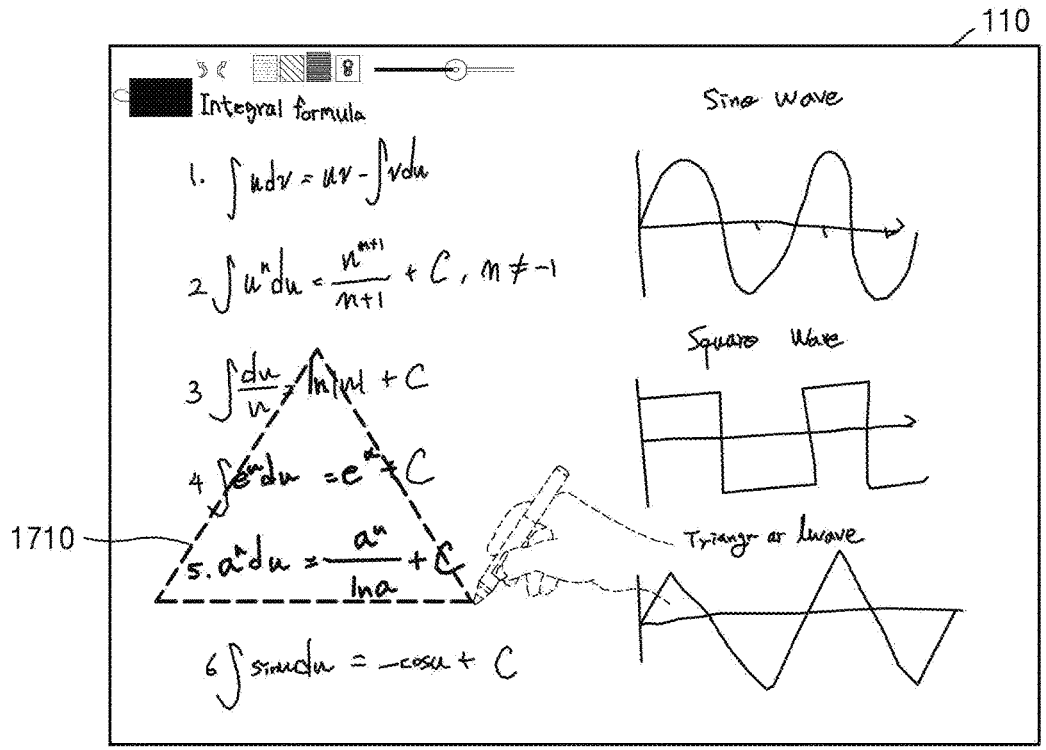

Referring to FIG. 17A, a display unit 110 is illustrated, in which it is possible to determine only object corresponding to a region inside a triangle-shaped closed curve 1710 as the selected object. A red color or a bold face are selected an attribute item of an object to be styled by the user, and when a triangle-shaped closed curve input is received, the control unit 140, as illustrated in FIG. 1, of the touch screen device 100, as illustrated in FIG. 1, may determine an object included in a region inside the closed curve 1710 as the selected object. The display unit 110 may display a changed attribute value on a touch screen.

The free curve drag input may select only a portion of an object. As illustrated in FIG. 17A, when the user's input is a free curve drag input for selecting some regions of integral formula objects 3 to 5 displayed on the touch screen, it may be impossible to accurately determine whether the free curve drag input selects all of integral formula objects 1 to 5 or selects only object inside the closed curve 1710, so as to be consistent with the user's intention. In view of the fact that the user may perform a drag input having various free curve shapes, it is reasonable that the user's drag input is determined as an input accurately selects only object inside the closed curve 1710 as in the latter case. However, the embodiment is not necessarily limited thereto, it should be noted that the object selection may be changed according to the user's setting.

Figure 17B:
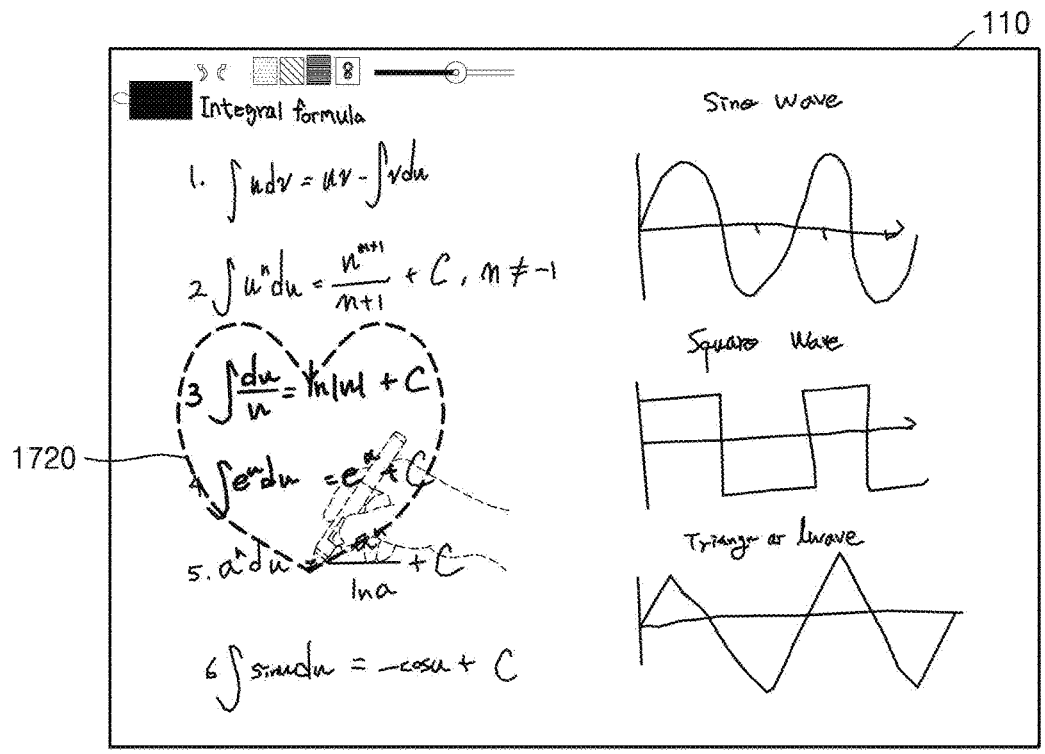

Referring to FIG. 17B, a display unit 110 is illustrated, in which it is possible to determine only object corresponding to a region inside a heart-shaped closed curve 1720 as the selected object. A red color and a bold face are selected as an attribute item of an object to be styled by the user, and when a heart-shaped closed curve input is received, the control unit 140 of the touch screen device 100 may determine an object included in a region inside the closed curve 1720 as the selected object. The display unit 110 may display a changed attribute value on the touch screen.

Since the heart-shaped closed curve input is a selection input with respect to a stroke-based object, a closed curve 1720 may be determined by a free curve drag input of a traversable network. The user may easily input a circular shape or a box shape with the traversable network. However, as illustrated in FIG. 17B, it may be difficult for the user to easily input a heart shape with the traversable network.

Therefore, it is not necessary to determine the closed curve input through the traversable network as an input for selecting an object, and even when the free curve drag input performed two or more times constitutes one closed curve 1720, the determination of the free curve drag input as the input for selecting the object may provide an intuitive interaction to the user.

Hereinafter, in a method of styling a selected object, a process of changing an attribute value of an object will be described in detail.

Figure 18:
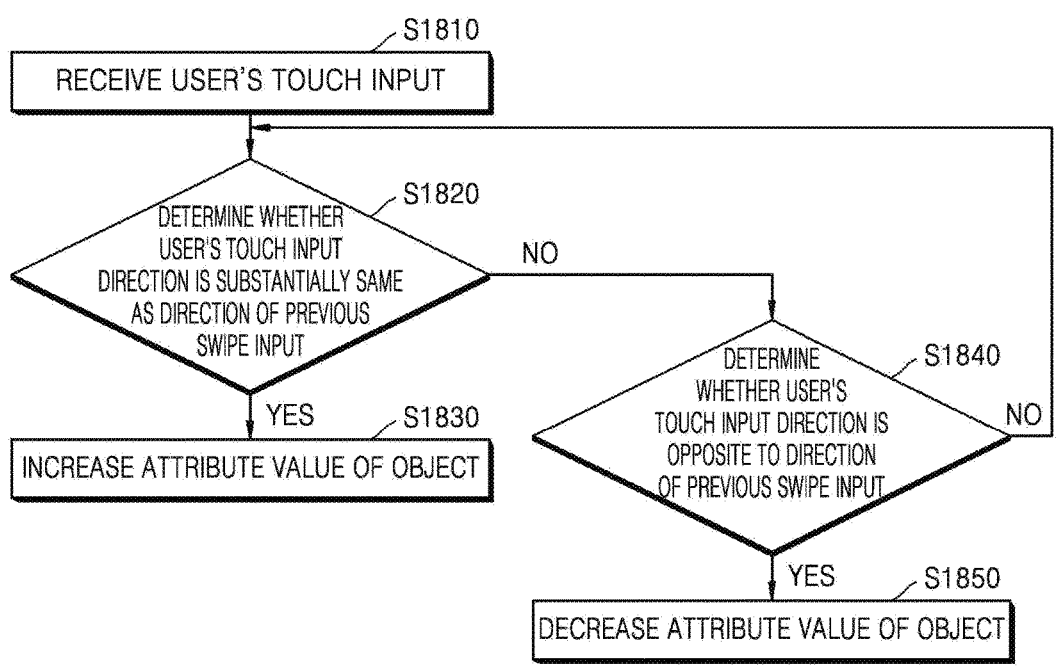
FIG. 18 is a flowchart of a method of styling content according to an embodiment of the present disclosure.

FIG. 18 is a flowchart of a method of styling content according to an embodiment of the present disclosure.

Referring to FIG. 18, a flowchart is illustrated, such that in operation S1810, the input unit 120, as illustrated in FIG. 1, of the touch screen device 100, as illustrated in FIG. 1, may receive a user's touch input. The user's touch input is an input for selecting an object, and since the input for selecting the object has been described in detail with reference to FIGS. 8A to 17B, descriptions thereof will be omitted. The control unit 140, as illustrated in FIG. 1, of the touch screen device 100 may change an attribute value of a selected object into a preset attribute value. After changing the attribute value, the touch screen device 100 may receive a continuous touch input from the user.

In operation S1820, the control unit 140 of the touch screen device 100 may determine whether a direction of the user's touch input is substantially the same as a direction of a previous swipe (drag) input.

In operation S1830, when the control unit 140 of the touch screen device 100 determines that the direction of the user's touch input is substantially the same as the direction of the previous swipe (drag) input (i.e., YES at operation S1830), the control unit 140 may increase the attribute value with respect to a previously changed attribute item. For example, after receiving a touch input for increasing a thickness of a writing object to an attribute value of about +1, when the control unit 140 receives a swipe input whose direction is substantially the same as a direction of the touch input, the control unit 140 may increase the attribute value of the +1-increased thickness in the writing object by about +1.

In operation S1840, when the control unit 140 determines that the direction of the user's touch input is different from the direction of the previous swipe (drag) input (i.e., NO at operation S1830), the control unit 140 may determine whether the user's touch input is an input whose direction is opposite to the direction of the previous swipe (drag) input.

In operation S1850, when the control unit 140 determines that the direction of the user's touch input is opposite to the direction of the previous swipe (drag) input (i.e., YES at operation S1840), the control unit 140 of the touch screen device 100 may change the attribute value in a direction opposite to a change direction of the changed attribute value. In other words, the control unit 140 may decrease the previously changed attribute value. For example, the previous swipe (drag) input is an input for increasing the thickness of the writing object by about +1 as a rightward drag input, and after a thickness attribute value of the writing object is changed from about +5 to about +6, when a leftward drag input is received, the thickness attribute value of the writing object may be changed in the direction opposite to the change direction of the changed attribute value, that is, from about +6 to about +5 that is as small as −1. If at operation S1840 the user's touch input direction is not the opposite to the direction of the previous swipe input (i.e., NO at operation S1840), the method returns to operation S1820.

FIGS. 19A to 20C are diagrams of objects before and after styling content according to an embodiment of the present disclosure.

Figure 19A:
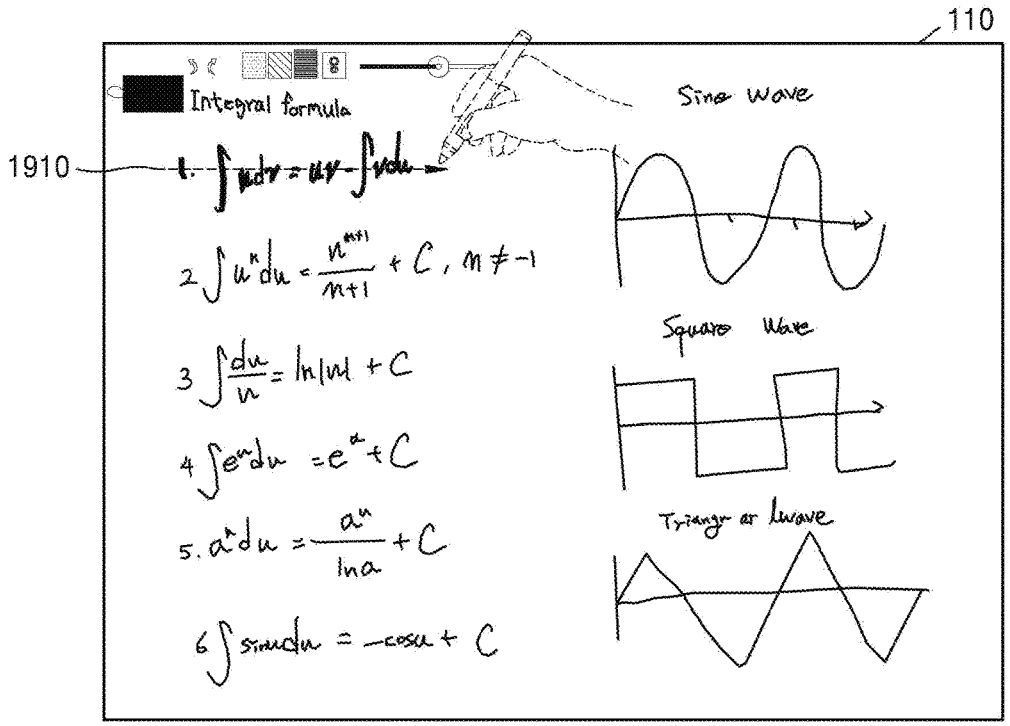
Figure 19B:
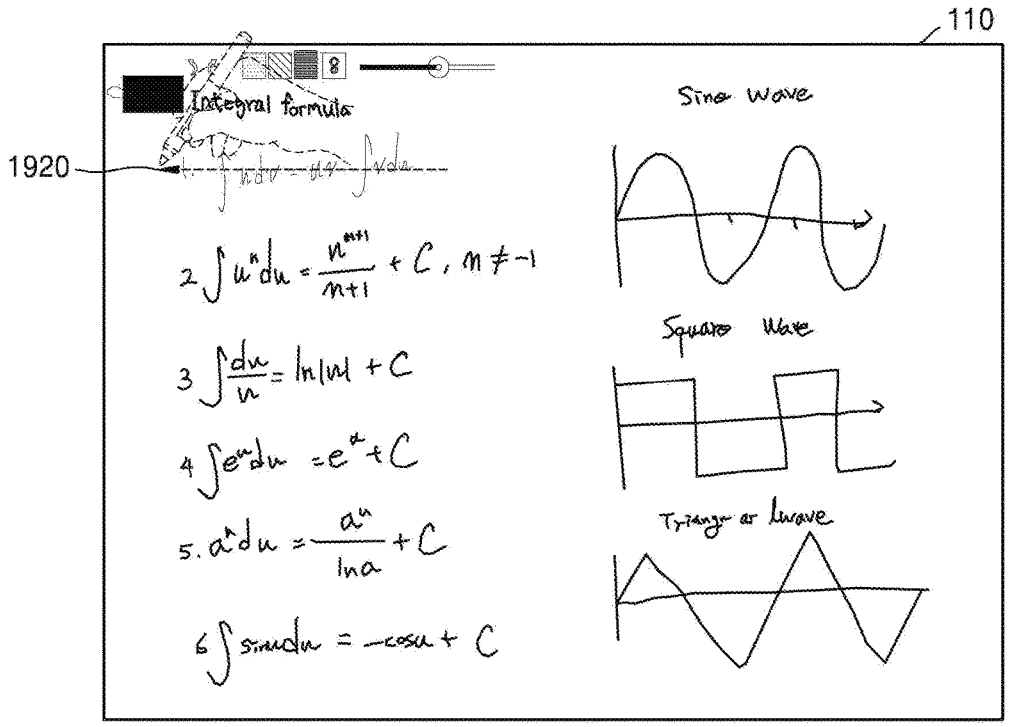
Figure 21A:
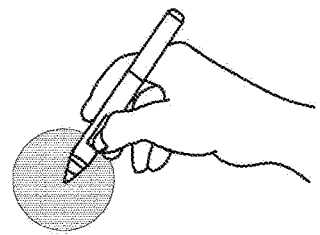
FIGS. 21A, 21B, 21C, and 21D are diagrams for describing a method of styling content according to an embodiment of the present disclosure.
Figure 21B:
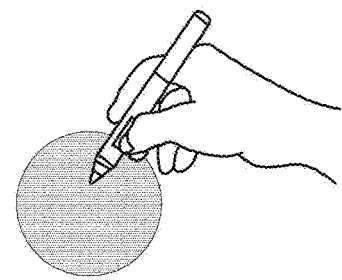
Figure 21C:
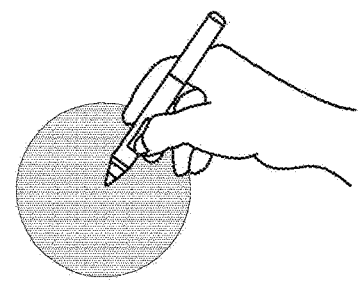
Figure 21D:
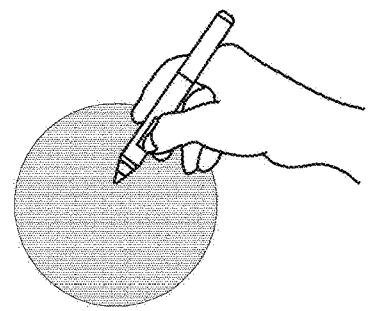

Referring to FIGS. 19A and 19B, a display unit 110 is illustrated, such that when a user performs a horizontal drag input with respect to an object displayed on a touch screen, the touch screen device 100, as illustrated in FIG. 1, may perform styling corresponding to the user's horizontal drag input.

As illustrated in FIG. 19A, the user may select a color and a thickness as an attribute item of an object 1910. The touch screen device 100 may store an attribute value such as the input color or the input thickness in the control unit 140, as illustrated in FIG. 1, and may be ready to change an attribute value with respect to an object to be selected later.

When the user performs a rightward drag input with respect to integral formula object 1 that is one of a plurality of objects displayed on the touch screen, a control unit 140 of the touch screen device 100 may apply, to integral formula object 1, the color and the thickness, that is, the attribute value of the object stored in the storage unit 130, as illustrated in FIG. 1. Therefore, the display unit 110 of the touch screen device 100 may display a color of the integral formula object 1 with a red color and may display a thickness of the integral formula object 1 more thickly.

As illustrated in FIG. 19B, the user may perform a withdrawal with respect to the previously performed styling. As described above, the input unit 120 of the touch screen device 100 has changed the attribute of the object into the red color and the bold face. The touch screen device 100 may receive a leftward drag input 1920 from a right to a left as a method of withdrawing (or canceling) the styling.

The touch screen device 100 stores a change history of an attribute value with respect to each object in a database, and since a method of storing the attribute value in the database has been described with reference to Tables 1 and 2, detailed descriptions thereof will be omitted. Therefore, even after the styling is applied to a content object displayed on the touch screen, the content object may be restored to an initial attribute, and the restoring operation may be performed through a drag input performed in a direction that is opposite to a direction of a drag input in the previous styling.

FIGS. 20A to 20C are diagrams for describing an increase and a decrease in attribute value of an object according to styling performed through a horizontal drag input according to an embodiment of the present disclosure.

Referring to FIG. 20A, after a user selects a bold face (thicker) as an attribute item of an object, when the user performs a rightward drag input with respect to integral formula object 1 displayed on a touch screen, as illustrated in FIG. 20B, the touch screen device 100, as illustrated in FIG. 1, may increase a thickness attribute value of integral formula object 1. For example, assuming that the thickness attribute value of integral formula object 1 is about 5, the touch screen device 100 may increase the thickness attribute value by about +1 by receiving the user's rightward drag input, and thus integral formula object 1 may have a thickness attribute value of about 6 in FIG. 20B and may have a thickness attribute value of about 7 in FIG. 20C. The storage unit 130, as illustrated in FIG. 1, of the touch screen device 100 may store a change history of the thickness attribute value in a database.

After that, when a leftward drag input is received from the user, the control unit 140, as illustrated in FIG. 1, of the touch screen device 100 may analyze the change history of the attribute value in the database to perform styling in a direction opposite to a direction of the change in the attribute value. In other words, when the leftward drag input is received with respect to integral formula object 1 displayed with the thickness attribute value of 7 illustrated in FIG. 20C, integral formula object 1 may be displayed with the thickness value of about 6 on the touch screen device as illustrated in FIG. 20B by decreasing the thickness attribute value of integral formula object 1 by about −1, and when the leftward drag input is again received, integral formula object 1 may be displayed with the thickness attribute value of about 5 as illustrated 20A.

The aforementioned rightward drag input and leftward drag input are merely determined as a styling method of emphasizing and withdrawing for convenience in description, but the embodiment is not limited thereto. Therefore, it is possible to determine the leftward drag input as an input for increasing an attribute value and determine the rightward drag input as an input as an input for decreasing the attribute value, and it should be noted that a horizontal drag input and a vertical drag input may also increase and decrease the attribute value.

FIGS. 21A to 21D are diagrams for describing a method of styling content according to an embodiment of the present disclosure.

A process of increasing and decreasing an attribute value of an object has been described with reference to 19A to 20C. A process of setting a user's desired attribute value by using the operation device 200, as illustrated in FIG. 2, as a stylus pen will be described with reference with FIGS. 21A to 21D.

The user may determine an attribute item of an object to be styled. As described above, the user may select an attribute item to be styled from among various attribute items such as a size, a color, a pen type, and a thickness of an object.

The user may perform a rightward drag input or a leftward drag input with respect to an object displayed on a touch screen as an input for selecting an object to be styled and may issue a styling command. However, in the case that it is necessary to widen a change width of an attribute value, it may be inconvenient for the user to perform a drag input several times. For example, when the user wants to style an object with a bold face, in order to increase a thickness attribute value from about +3 to about +7, it may be necessary to perform the rightward drag input four times.

In order to remove the inconvenience, a change in attribute value using a pen pressure of the operation device 200 will be described in the embodiment.

As illustrated in FIGS. 21A to 21D, the touch screen device 100, as illustrated in FIG. 1, provided with a pressure sensor may measure an input pressure (hereinafter, referred to as a "pen pressure") of the operation device 200 of the user. Therefore, the object may be scaled by matching an intensity of the pen pressure with the change width of the attribute value.

For example, when a touch of the operation device 200 with pen pressure intensity 3 is input from the user, the touch screen device 100 may set a thickness attribute value of an object to 3 to apply styling. In the same manner, when a touch of the operation device 200 with pen pressure intensity 7 is input from the user, the touch screen device 100 may set the thickness attribute value to 7 to apply styling. The display unit 110, as illustrated in FIG. 1, of the touch screen device 100 may display an attribute value corresponding to a pen pressure to be measured and may allow the user to adjust the pen pressure. When the display unit 110 of the touch screen device 100 displays the thickness attribute value, the display unit 110 may display the thickness attribute value as a size of a pen point region according to the pen pressure. In the case of a color, it is possible to differently display a color displayed according to the pen pressure to be measured. In addition, in the case of a pen type, various types of pens may be displayed according to the pen pressure to be measured.

In addition to the adjustment of the change width in the attribute value according to the intensity of the pen pressure, the change width of the attribute value may also be adjusted by using the auxiliary button 220, as illustrated in FIG. 2, of the operation device 200. Whenever the user pushes the auxiliary button 220, the touch screen device 100 may increase the attribute value of the object by receiving push information of the auxiliary button 220 from the operation device 200.

For example, when the user applies styling for changing a pen type of the displayed object, the attribute item of the object may be changed from a pen type such as a brush type to a pen type such as a pencil type or a highlighter type. Since it may be inconvenient for the user to select a menu item displayed on the touch screen whenever styling is applied, the touch screen device 100 may receive input information of the auxiliary button 220 whenever the auxiliary button 220 is pushed and may change the attribute value of the pen type from the brush type through the pencil type to the highlighter type based on the received input information of the auxiliary button 220. The display unit 110 of the touch screen device 100 may display, on the touch screen, a pen point to which the changed attribute value is applied and may notify the user to adjust the attribute value.

The touch screen device 100 may provide styling using the auxiliary button 220 with respect to an attribute value of the color. For example, whenever the user pushes the auxiliary button 220, the touch screen device 100 may receive the input information of the auxiliary button 220 and may change the attribute value of the color according to a predetermined order or an order set by the user. The display unit 110 of the touch screen device 100 may display an attribute value to be changed of the color on the touch screen and may allow the user to accurately select a color.

The touch screen device 100 may set attribute values of various objects through a combination of a pen pressure input by the user and the auxiliary button 220 of the operation device 200. For example, the touch screen device 100 may change the color attribute value of the object whenever the input information of the auxiliary button 220 is received, may change the thickness attribute value of the object according to the pen pressure to be measured, and may provide intuitive and easy styling to the user.

FIGS. 22 to 26D are diagrams of predetermined objects before and after styling the predetermined objects according to an embodiment of the present disclosure.

Figure 22:
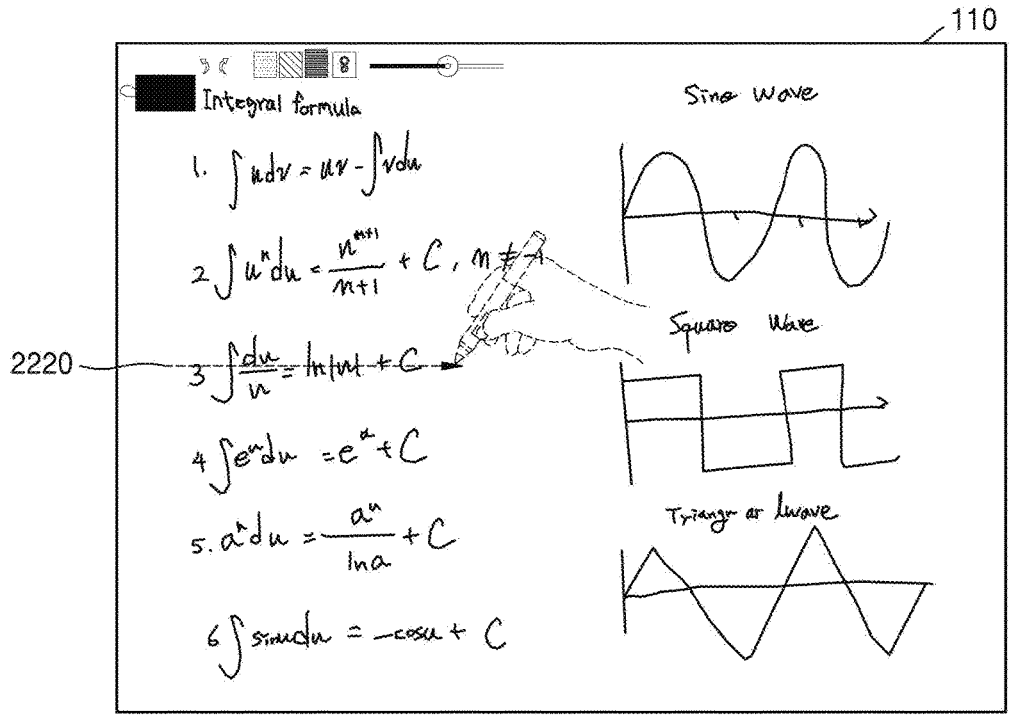

As described with reference to FIG. 7, FIG. 22 is a diagram of a display unit 110 for describing a horizontal drag input 2220, more specifically, a rightward drag input with respect to an object displayed on a touch screen. When a user's rightward drag input 2220 is received with respect to integral formula object 3 displayed on the touch screen, a touch screen device 100 may change an attribute value of integral formula object 3. FIGS. 23 to 26D below are diagrams for describing an object having a changed attribute value.

Figure 23:
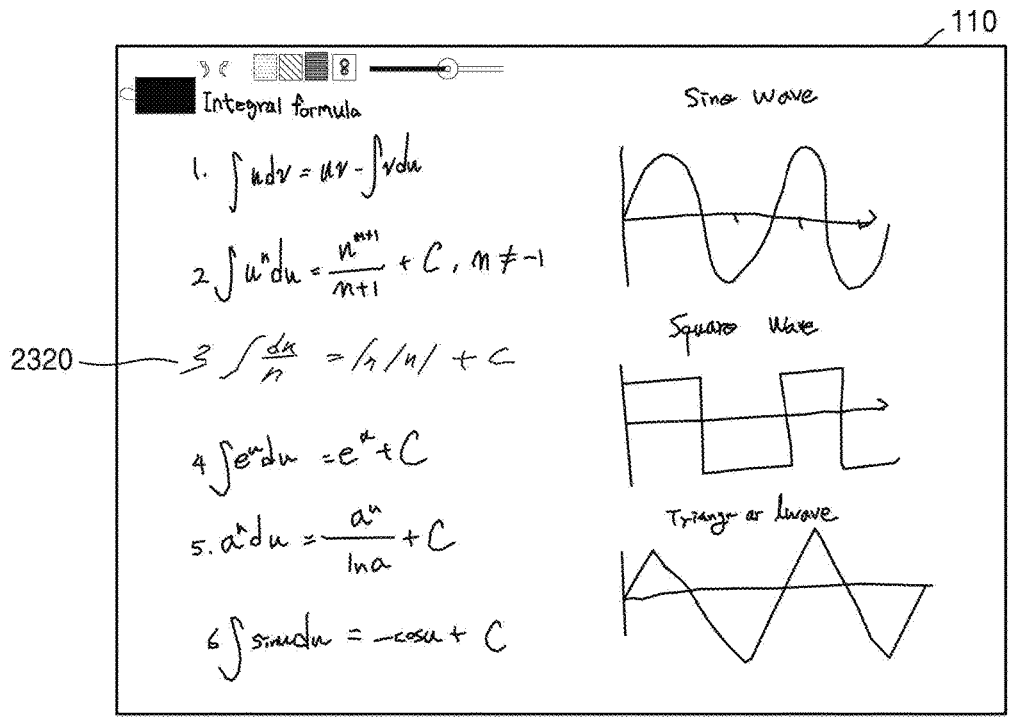

Referring to FIG. 23, a display unit 110 of the touch screen device 100, as illustrated in FIG. 1, may change a slant attribute value of a specific object. When an attribute item such as an oblique type or an italic type is received with respect to a slant change of an object by a user, a touch screen device 100 may store the slant attribute value and may change the slant attribute value of the object through a rightward drag input 2320 on the touch screen.

Figures 24A, 24B:
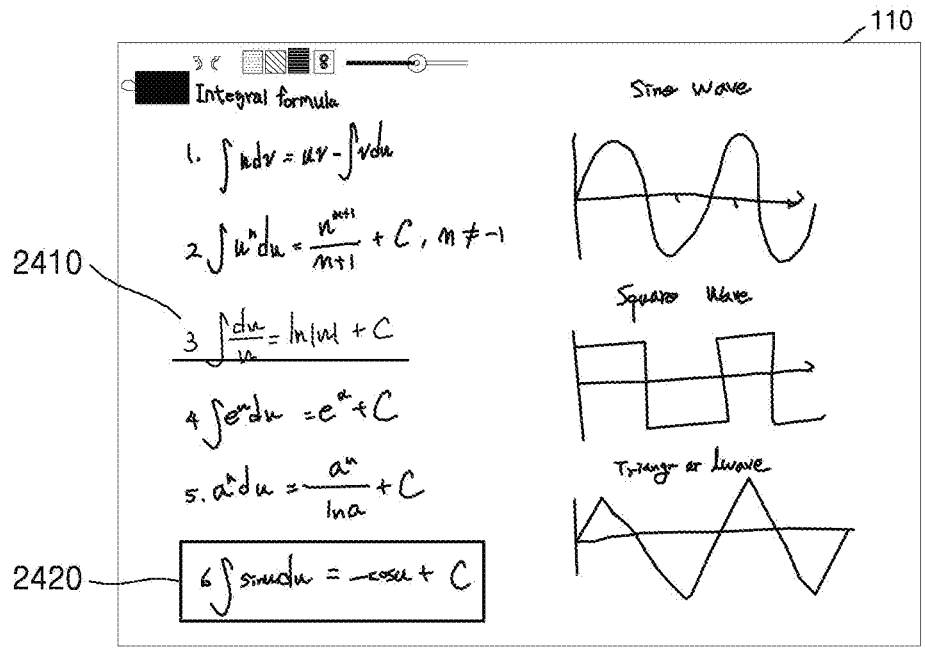

Referring to FIG. 24A, a display unit 110 is illustrated, in which styling may be performed which adds a figure such as an underline or a box to an object. Styling 2410 may be applied which underlines integral formula object 3, and box styling 2420 may be applied to integral formula object 6. The styling may allow the user to have an experience such as a note and may provide a realistic interaction to the user.

Referring to FIG. 24B, a display unit 110 is illustrated, in which underline styling may also be changed in various shapes. Since there is a preferred styling type for each user, changed various shapes of underlines 2415 may also be provided with respect to the underline.

Figure 24C:
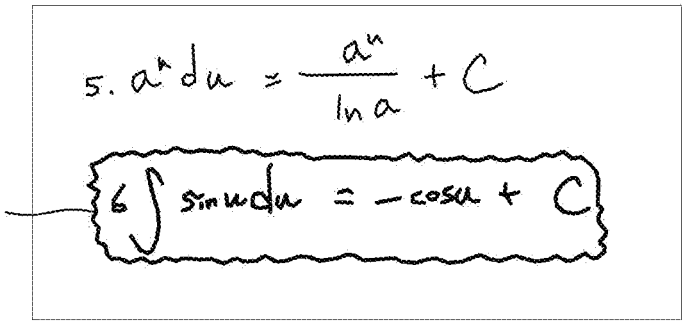

Referring to FIG. 24C, a box styling may also be changed in various shapes. Since there is a preferred styling type for each user, changed various shapes of boxes 2425 may also be provided with respect to the box.

Figure 24D:
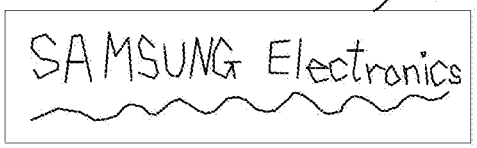

Referring to FIG. 24D, a text styling and underlining 2435 may be changed.

The changes in styling of FIGS. 24B and 24C may be applied to an object that is recognizable with writing. Even when a writing input using a stylus pen is recognizable as text information, a changed type of styling may be applied.

Referring to FIGS. 25A to 25D, the touch screen device 100, as illustrated in FIG. 1, may perform styling for changing a size and a ratio of an object. When a drag input is received with respect to a specific object 2510 displayed on a touch screen, as illustrated in FIG. 25A, the specific object may be displayed with an italic type 2520 on the touch screen 100, as illustrated in FIG. 25B, and as illustrated in FIGS. 25C and 25D, the specific object may be displayed on the touch screen by increasing or decreasing a top to bottom ratio thereof 2530 and 2540.

As described above, the displaying of the object may be performed in a different manner from the aforementioned changing of the attribute value of the object. Each object may have an (x, y) two-dimensional coordinate value, and since the storing of the object as the coordinate value has been described above, detailed descriptions thereof will be omitted. The touch screen device 100 may change the coordinate value of the object and may display the object like styling the object.

In FIG. 25B, the coordinate value of the object may be changed by displaying the object with an oblique type (italic type). The touch screen device 100 may display the object with the italic type by shifting, to the right, coordinates of an upper end region in central coordinates and shifting, to the left, coordinates of a lower end region in the central coordinates to left, with respect to the central coordinates of the object. As illustrated in FIGS. 25C and 25D, the coordinates of the object may be shifted upward and downward to change the size of the object and differently display the ratio of the object.

In a case of objects illustrated in FIGS. 26A to 26D, as described with reference to FIGS. 25A to 25D, all or some of coordinate values in a selected object may be shifted to magnify or reduce the object and differently display a left-to-right ratio of the object.

Referring to FIGS. 26A and 26B, when an integral formula object 2610 is selected and styling for reducing/magnifying is performed with respect to the integral formula object 2610, the touch screen device 100, as illustrated in FIG. 1, may change coordinate values of the integral formula objects 2610 and 2620 to reduce or magnify integral formula objects 2610 and 2620. The touch screen device 100 may change coordinate values of four edges in integral formula objects 2610 and 2630 and may change all coordinate values of the integral formula objects 2610 and 2620 so as to be proportional to the coordinate values of the four edges and may display integral formula objects 2610 and 2620 such that a size thereof is reduced or magnified.

Referring to FIGS. 26C and 26D, coordinate values on a horizontal axis of writing objects 2630 and 2640 may be changed to display the writing objects 2630 and 2640 such that a space between letters thereof is reduced or magnified. Upper and lower coordinate values of the writing objects 2630 and 2640 may not be changed and left and light coordinate values may be changed to perform styling for changing the space between letters.

FIGS. 27A to 28C are diagrams for describing a method of styling content according to an embodiment of the present disclosure.

When the touch screen device 100, as illustrated in FIG. 1, applies styling to an object displayed on a touch screen, the touch screen device 100 may change an attribute value of the other object by using a styling attribute of a specific object. When the touch screen device 100 receives an input for selecting an object that has a reference attribute value, the touch screen device 100 may change the attribute value of the selected object into a replacement value of the attribute value in the other object.

Figure 27A:
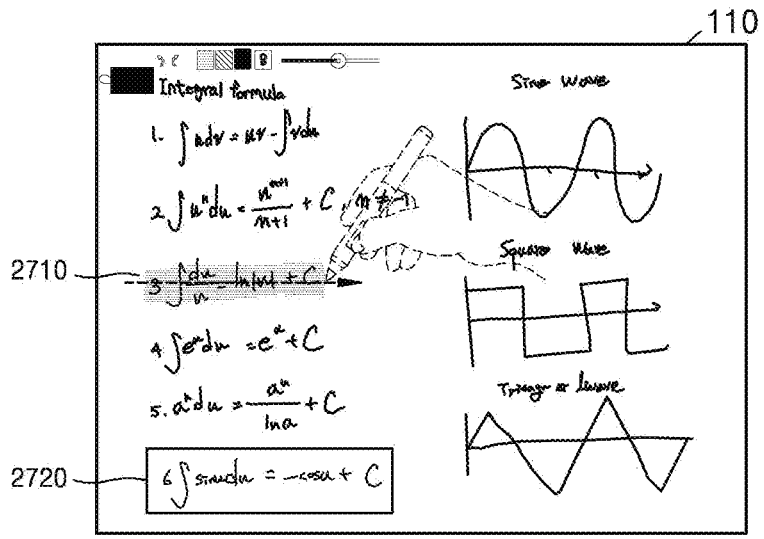
Figure 27B:
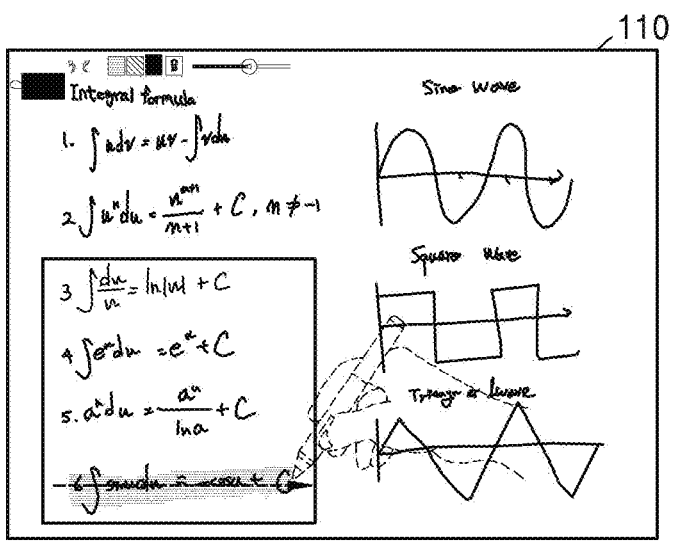
Figure 27C:
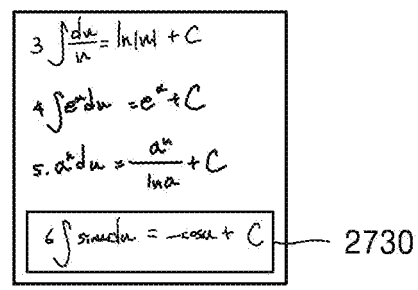

Referring to FIGS. 27A to 27C, when a display unit 110 of the touch screen device 100 receives an input 2710 selecting a specific object and receives a drag input 2720 with respect to an object to be styled, the touch screen device 100 may change the attribute value 2730 of the object to be styled by using the attribute value of the specific object.

As described above, in a case of copying the styling attribute value of the specific object, intuitive styling may be provided to the user by using the auxiliary button 220, as illustrated in FIG. 2, of the operation device 200, as illustrated in FIG. 2. For example, in the state that the user pushes the auxiliary button 220 with respect to an object having an attribute value to be copied, when the user performs a drag input, the touch screen device 100 may receive input information of the auxiliary button 220 from the operation device 200 to determine the drag input as a command for copying the attribute value of the object based on the drag input and the input information of the auxiliary button 220. The copied attribute value may be applied to an object of a region in which the drag input is received from the user to perform styling, thereby providing the same effect as using a pipette to the user.

In a case of FIGS. 27A and 27B, since an unified attribute value exists in the objects, there is no limitation in the case of copying of the attribute value, but in the case that a plurality of attribute values are applied to the objects, it is necessary to establish a reference with respect to what attribute value is copied when the attribute value is copied.

Referring to FIG. 28A, when an attribute value of integral formula object 2810 is copied onto an attribute value of integral formula object 2820, it is unnecessary to establish a reference of an attribute value to be copied, but as illustrated in FIG. 28B, when objects 2831, 2832 and 2833 having different attribute values exist in one object 2830, it is necessary to establish a representative attribute value.

Referring to FIG. 28B, when one object has a plurality of attribute values, an attribute value that is a most important factor may be established as the representative attribute value. However, according to the aforementioned method, when the factor is the same and it impossible to calculate the factor, it may be impossible to establish the representative attribute value.

Referring to FIG. 28C, the touch screen device 100 may display input boxes 2840 for selecting a plurality of attribute values on the touch screen such that the user selects the representative attribute value. In this case, it is possible to solve the limitation of FIG. 28B and accurately receive the user's intention.

FIGS. 29A to 30B are diagrams of a method of styling content according to a direction of a user's touch input according to an embodiment of the present disclosure.

Figure 29A:
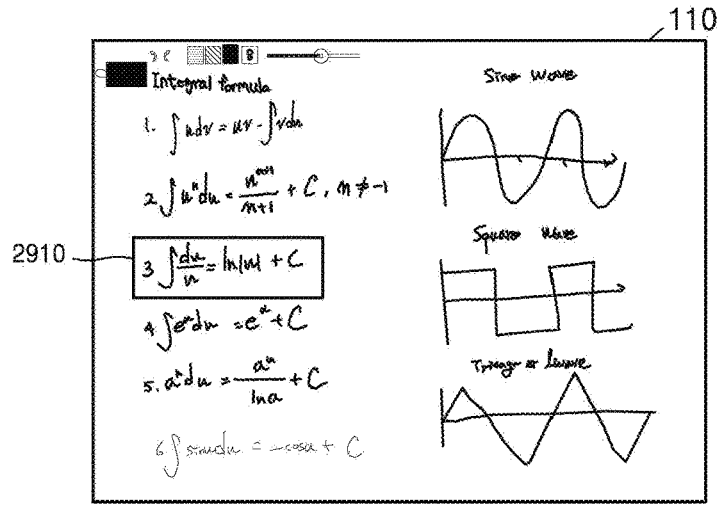
FIGS. 29A, 29B, 29C, 30A, and 30B are diagrams of a method of styling content according to a direction of a user's touch input according to an embodiment of the present disclosure.
Figure 29B:
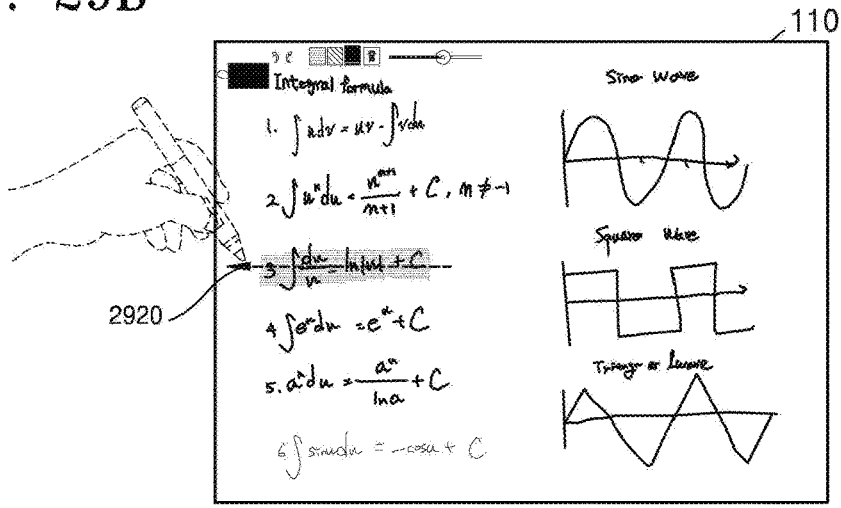
Figure 29C:
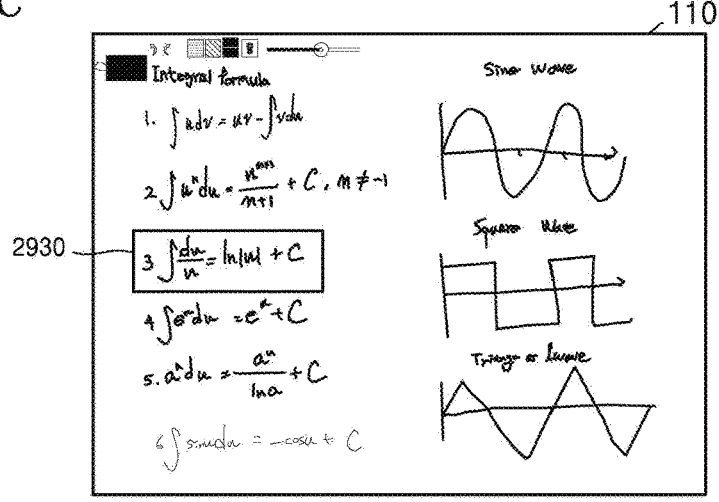

Referring to FIGS. 29A to 29C, a display unit 110 is illustrated, wherein, while the objects displayed on the touch screen device 100, as illustrated in FIG. 1, are styled by the user, it has been described that the horizontal drag input is determined as the input for increasing or decreasing the attribute value.

A rightward drag input of the horizontal drag input may be determined as an input changing the attribute value, and a leftward drag input 2920 may be determined as an input withdrawing (or canceling) the attribute value. For example, as illustrated in FIG. 29A, when a color of integral formula object 2910 is changed into a blue color, when the rightward drag input is received, integral formula object 2910 may be styled into the blue color. When the leftward drag input 2920 is received with respect to integral formula object 2910, the touch screen device 100 may change the color of integral formula object 2910 into a color 2930 before the change.

According to the aforementioned method, when various attribute values are changed with respect to an object, since a history is stored in a database for each object whose attribute value is changed, the object may be restored to an initial attribute value. The auxiliary button 220, as illustrated in FIG. 2, of the operation device 200, as illustrated in FIG. 2, may be used to accurately distinguish the rightward drag input and the leftward drag input described above with reference to FIGS. 20A to 20C.

Figure 30A:
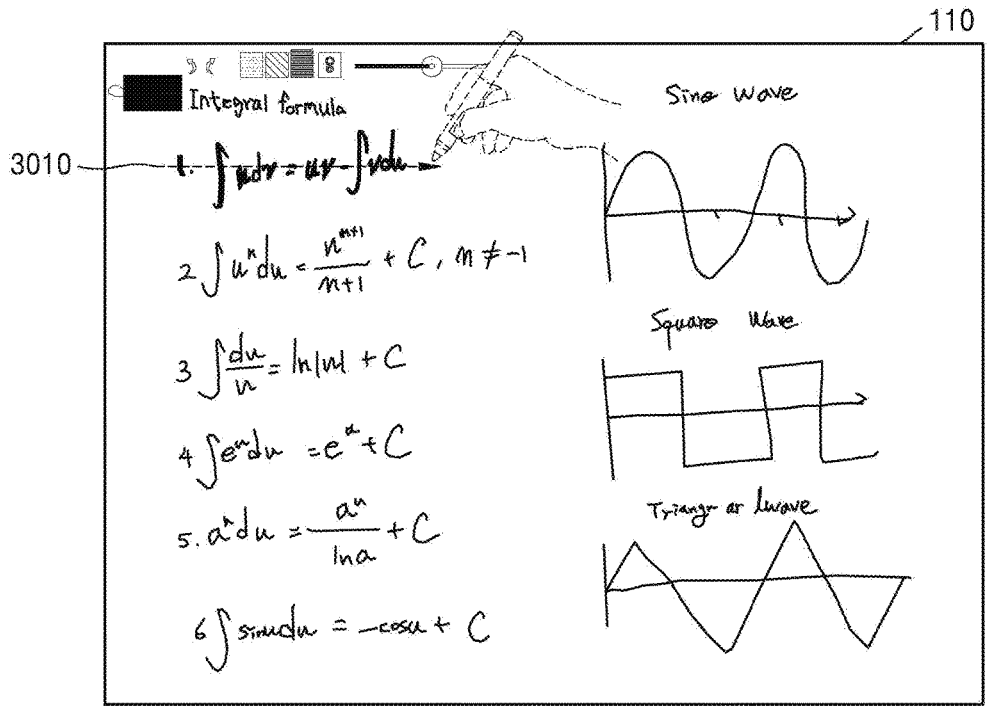

For example, referring to FIG. 30A, a reception of a rightward drag input 3010 input on a display unit 110 will be described which increases a thickness attribute value of integral formula object 1. It is assumed that the thickness attribute value of integral formula object 1 is 4. Whenever the rightward drag input 3010 is received from the user, the touch screen device 100, as illustrated in FIG. 1, may increase the thickness attribute value by about +1. It has been described that when the rightward drag input 3010 is received once, the thickness attribute value may be increased to 5, and when the rightward drag input 3010 is received three times, the thickness attribute value may be increased to 7. In the case that the thickness attribute value of integral formula object 1 is increased to 7 by receiving the rightward drag input three times, when the leftward drag input is received, the thickness attribute value may be decreased to 6, and when the auxiliary button 220, as illustrated in FIG. 2, is pushed and the leftward drag input is received at the same time, the thickness attribute value may be decreased to an initial attribute value of 4. Since the method may be set according to a user's definition, it should be noted that the embodiment is not limited to the above-described example.

Figure 30B:
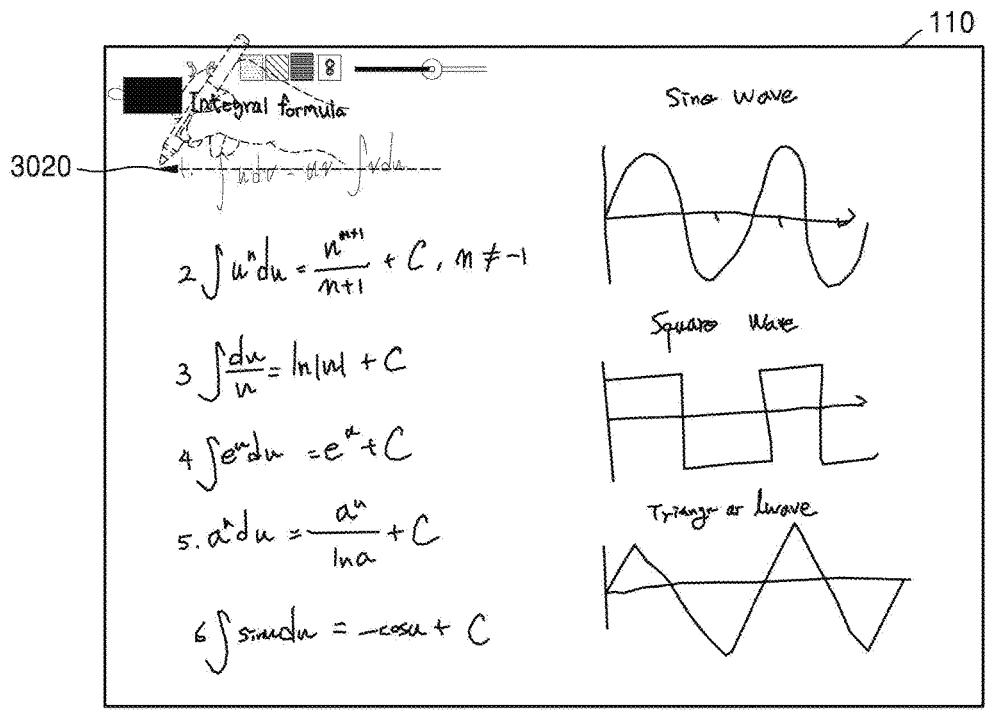

Referring to FIG. 30B, a reception of a leftward drag input 3020 input on a display unit 110 will be described which decreases a thickness attribute value of integral formula object 1. Whenever the leftward drag input 3020 is received from the user, the touch screen device 100, as illustrated in FIG. 1, may decrease the thickness attribute value by about −1. Since the method may be set according to a user's definition, it should be noted that the embodiment is not limited to the above-described example.

In a digital apparatus performing various functions, a user environment is the key issue. For example, when a smart television is used in the living room of the average home by replacing an existing television, one of key issues is whether the user is able to conveniently use the various functions provided by the smart television. The smart television may provide broadcasting contents and may also provide various internet-based contents such as an internet web surfing, an electronic mail, a game, a photograph, a music, and a video media, which has been available in an existing personnel computer. When the providing of various contents incommodes the user, and resultantly, the utility of the smart television may be reduced. In this respect, according to the various embodiments of the present disclosure, an apparatus and method of proving a graphical user interface may be applied to a multimedia apparatus such as the smart television, thereby improving a user convenience.

The present disclosure can also be embodied as processor-readable codes on a non-transitory processor-readable recording medium provided in a digital device such as a central processing unit (CPU). The non-transitory processor-readable recording medium is any data storage device that can store data which can be thereafter read by a processor. Examples of the non-transitory processor-readable recording medium include read-only memory (ROM), random-access memory (RAM), compact disc ROMs (CD-ROMs), magnetic tapes, floppy disks, and optical data storage devices. The non-transitory processor-readable recording medium can also be distributed over network coupled computer systems so that the processor-readable code is stored and executed in a distributed fashion. In addition, functional programs, codes, and code segments for accomplishing the various embodiments can be easily construed by programmers skilled in the art to which the inventive concept pertains.

The method of styling the object according to an embodiment may be implemented in one software (SW) function program, and a whole or a portion of the method may be implemented in several SW function modules and may be implemented on an operating system (OS). For example, as described with reference to FIG. 18, operation S1820 of determining whether the direction of the user's touch input is substantially the same as the direction of the previous swipe input, and operation S1830 or S1840 of increasing or decreasing the attribute value of the object may be implemented in one SW function program. Each operation or the combination thereof may be implemented in one SW function module and may be implemented on an OS.

It should be understood that various embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of styling content on a touch screen device, the method comprising:
    displaying a plurality of representations of attribute values with respect to an attribute item of a stroke-based object on a touch screen of the touch screen device;
    receiving a user's input with respect to the attribute item of the stroke-based object, the stroke-based object having a first attribute value of the attribute item;
    receiving, on a touch screen of the touch screen device, a user's touch input with respect to a region indicating the stroke-based object, the user's touch input comprising a linear drag input intersecting at least a portion of the stroke-based object; and
    in response to receiving the linear drag input intersecting at least the portion of the stroke-based object, changing the first attribute value of the stroke-based object to a second attribute value based on the attribute item of the stroke-based object and a direction of the linear drag input.

2. The method of claim 1, further comprising displaying the stroke-based object having the second attribute value on the touch screen.

3. The method of claim 1, wherein the receiving of the user's input with respect to the attribute item of the stroke-based object comprises displaying the attribute item with respect to a changeable attribute value of the stroke-based object on the touch screen.

4. The method of claim 1, wherein the attribute item of the stroke-based object comprises at least one of a size, a color, a pen type, a thickness, or an input time.

5. The method of claim 1, wherein the receiving of the user's touch input with respect to the region indicating the stroke-based object comprises receiving an input for selecting an object through one of:
    a touch input in a region including a whole or a portion of the stroke-based object; or
    a touch input with respect to a region preset on the touch screen.

6. The method of claim 1, further comprising:
    selecting an object having an attribute value that is to be changed, based on the user's touch input,
    wherein, when the object comprises a writing object, the selecting of the object comprises selecting the object in one of a sentence or a plurality of sentences that includes the object.

7. The method of claim 1, further comprising:
    selecting an object having an attribute value that is to be changed, based on the user's touch input, wherein, when the object is included in a layout, the selecting of the object comprises selecting all objects of the layout including the object.

8. The method of claim 1, further comprising:
when the user's touch input is determined to be a touch input preset with the stroke-based object, selecting an object corresponding to the region indicating the stroke-based object.

9. The method of claim 1, wherein the user's touch input comprises at least one of a touch input, a swipe input, or a free curve input.

10. The method of claim 9,
wherein, when the user's touch input is determined to be the swipe input having a substantially same direction as a direction of a previous swipe input, the first attribute value of the stroke-based object is increased, and
wherein, when the user's touch input is determined to be the swipe input having an opposite direction to the direction of the previous swipe input, the first attribute value of the stroke-based object is decreased.

11. The method of claim 1, wherein the receiving of the user's input with respect to the attribute item of the stroke-based object comprises:
receiving the user's input with respect to a region indicating another object having an attribute value different from the first attribute value of the stroke-based object; and
storing the attribute value of the other object in a storage of the touch screen device.

12. The method of claim 1, wherein the attribute item of the stroke-based object comprises a preset attribute value.

13. The method of claim 12, wherein the receiving of the user's input with respect to the attribute item of the stroke-based object comprises storing the preset attribute value in a storage of the touch screen device.

14. A touch screen device for styling content, the touch screen device comprising:
at least one sensor;
a touch screen;
at least one processor; and
at least one memory storing instructions configured to be executed by the at least one processor,
wherein, when executed, the instructions cause the at least one processor to:
control the touch screen to display a plurality of representations of attribute values with respect to an attribute item of a stroke-based object,
control the at least one sensor to receive a user's input with respect to the attribute item of the stroke-based object, the stroke-based object having a first attribute value of the attribute item,
control the at least one sensor to receive a user's touch input with respect to a region indicating the stroke-based object on the touch screen, the user's touch input comprising a linear drag input intersecting at least a portion of the stroke-based object,
in response to receiving the linear drag input intersecting at least the portion of the stroke-based object, change the first attribute value of the stroke-based object to a second attribute value based on the attribute item of the stroke-based object and a direction of the linear drag input, and
in response to changing the first attribute value of the stroke-based object to the second attribute value, control the touch screen to display the stroke-based object having the second attribute value.

15. The touch screen device of claim 14, wherein the instructions further cause the at least one processor to control the touch screen to display the attribute item with respect to a changeable attribute value of the stroke-based object on the touch screen.

16. The touch screen device of claim 14, wherein an attribute of the stroke-based object comprises at least one of a size, a color, a pen type, a thickness, or an input time.

17. The touch screen device of claim 14, wherein the instructions further cause the at least one sensor to receive an input for selecting an object through one of:
a touch input in a region including a whole or a portion of the stroke-based object; or
a touch input with respect to a region preset on the touch screen.

18. The touch screen device of claim 14, wherein the user's touch input comprises at least one of a touch input, a swipe input, or a free curve input.

19. The touch screen device of claim 18,
wherein, when the user's touch input is determined to be the swipe input having a substantially same direction as a direction of a previous swipe input, the instructions further cause the at least one processor to increase the attribute value of the stroke-based object, and
wherein, when the user's touch input is determined to be the swipe input having an opposite direction to the direction of the previous swipe input, the instructions further cause the at least one processor to decrease the attribute value of the stroke-based object.

20. The touch screen device of claim 14,
wherein the instructions further cause the at least one processor to control the at least one sensor to receive the user's input with respect to a region indicating another object having an attribute value different from the attribute value of the stroke-based object, and
wherein the at least one memory is further configured to store the attribute value of the other object.

21. The touch screen device of claim 14, wherein the attribute item of the stroke-based object comprises a preset attribute value.

22. The touch screen device of claim 21, wherein the at least one memory is further configured to store the preset attribute value.

23. The touch screen device of claim 14, wherein the user's touch input is received using a stylus pen.

24. A non-transitory computer-readable storage medium storing instructions that, when executed, cause at least one processor to perform the method of claim 1.

* * * * *